(12) United States Patent
Kuwana

(10) Patent No.: US 7,285,050 B2
(45) Date of Patent: Oct. 23, 2007

(54) GAMING SYSTEM

(75) Inventor: Hiroyuki Kuwana, Tokyo (JP)

(73) Assignee: Aruze Corp., Tokyo (JP)

( * ) Notice: Subject to any disclaimer, the term of this patent is extended or adjusted under 35 U.S.C. 154(b) by 395 days.

(21) Appl. No.: 10/743,335

(22) Filed: Dec. 23, 2003

(65) Prior Publication Data

US 2004/0147325 A1 Jul. 29, 2004

(30) Foreign Application Priority Data

Dec. 27, 2002 (JP) .............................. 2002-382433

(51) Int. Cl.
*A63F 9/24* (2006.01)

(52) U.S. Cl. .......................................... 463/42; 463/23

(58) Field of Classification Search ................. 463/16, 463/17, 18, 19, 20–30, 40–42, 1, 10–13, 463/36; 273/138.1, 138.2, 139, 143 R, 292–293
See application file for complete search history.

(56) References Cited

U.S. PATENT DOCUMENTS

| 5,116,055 | A | * | 5/1992 | Tracy ............................ 463/27 |
| 5,564,700 | A | * | 10/1996 | Celona ........................... 463/27 |
| 5,580,309 | A | * | 12/1996 | Piechowiak et al. ........... 463/16 |
| 5,823,879 | A | * | 10/1998 | Goldberg et al. .............. 463/42 |
| 6,077,162 | A | * | 6/2000 | Weiss ............................. 463/26 |
| 6,165,070 | A | * | 12/2000 | Nolte et al. .................... 463/20 |
| 6,224,484 | B1 | * | 5/2001 | Okuda et al. .................. 463/27 |
| 6,312,332 | B1 | * | 11/2001 | Walker et al. ................. 463/23 |

FOREIGN PATENT DOCUMENTS

| EP | 0 962 900 A | 12/1999 |
| EP | 1 066 867 A | 1/2001 |
| JP | 2001293179 | 10/2001 |
| JP | A-2001-331721 | 11/2001 |
| JP | A-2002-35428 | 2/2002 |
| JP | A-2002-95870 | 4/2002 |
| JP | A-2003-190637 | 7/2003 |

OTHER PUBLICATIONS

ARCADIA, "Sega Four-Player Mahjong MJ," Enterbrain, Inc., Oct. 1, 2002, vol. 3, No. 10, p. 52.
Japanese Notice of Reasons for Rejection, dated Aug. 22, 2006, in corresponding Japanese application.

* cited by examiner

*Primary Examiner*—Robert E Pezzuto
(74) *Attorney, Agent, or Firm*—Lowe, Hauptman, Ham & Berner, LLP

(57) ABSTRACT

In a gaming system provided with a plurality of terminals operable by the respective plurality of the players; and a gaming server communicating with the plurality of the terminals, the gaming server comprises a controller executing a computer program and controlling the plurality of the terminals, the controller generates a special interval for stopping a progress of the game in a special mode, and the controller generates a dummy interval in a normal mode during the game.

6 Claims, 19 Drawing Sheets

Fig. 5

| ID | Name | Password | Address | Identification information | E-mail | Personal game history file | ... |
|---|---|---|---|---|---|---|---|
| 0001 | Name 1 | Password 1 | Address 1 | Identification information 1 | E-mail 1 | Personal game history file 1 | ... |
| 0002 | Name 2 | Password 2 | Address 2 | Identification information 2 | E-mail 2 | Personal game history file 2 | ... |
| 0003 | Name 3 | Password 3 | Address 3 | Identification information 3 | E-mail 3 | Personal game history file 2 | ... |
| 0004 | Name 4 | Password 4 | Address 4 | Identification information 4 | E-mail 4 | Personal game history file 4 | ... |
| ... | ... | ... | ... | ... | ... | ... | ... |

Fig. 11

| | |
|---|---|
| Don-chan | 8th grade |
| Birthstone | emerald |
| Acquired jewels | 67 pieces |
| Emeralds | 5 pieces |
| Points | 77 |

Fig. 12
 *January Garnet*
 *February Amethyst*
 *March Aquamarine*
 *April Diamond*
 *May Emerald*
 *June Pearl*
 *July Ruby*
 *August Peridot*
 *September Sapphire*
 *October Opal*
 *November Topaz*
 *December Turquoise*

Fig. 13

| 10th through 1st class | Changed on the basis of the number of game-turns and the number of acquired credit points. No demotion. |
|---|---|
| 1st through 10th grade | Changed on the basis of the number of acquired credit points. With demotion. |
| Mah-jong Master | Awarded to the 1st ranked player of each prefecture. 48 Masters countrywide. |
| Mah-jong King | Awarded to the 1st ranked player in the number of acquired jewels. 12 Kings countrywide. |
| Mah-jong Saint | Awarded to the 1st ranked player. The only Saint countrywide. |

Fig. 14

Tokyo Mah-jong Master

JAPAN RANKING

| | | | |
|---|---|---|---|
| 1st place | Tokyo /200P | Mah-jong Master/Don-chan | /45P |
| 2nd place | Kanagawa/189P | Mah-jong Master/King | /40P |
| 3rd place | Chiba /176P | Mah-jong Master/Leo | /33P |
| 4th place | Hokkaido /150P | Mah-jong Master/Yana | /29P |
| 5th place | Fukuoka /120P | Mah-jong Master/Gamma | /27P |

GAMING SYSTEM

CROSS-REFERENCE TO THE RELATED APPLICATIONS

This application is based upon and claims a priority from the prior Japanese Patent Application No. 2002-382433 filed on Dec. 27, 2002, the entire contents of which are incorporated herein by reference.

This application is related to co-pending U.S. patent application entitled "Gaming System For Providing Game", the application being filed on even date herewith. The co-pending application is expressly incorporated herein by reference.

FIELD OF THE INVENTION

The present invention relates to a gaming system.

RELATED ART

Conventionally, in gaming systems, a configuration is known in which a plurality of terminals operable by players are connected to a gaming server for providing information based on the signals received from the plurality of terminals. This allows the players to enjoy a game without gathering at a particular place.

An example of such a gaming system is a video game device for allowing many and unspecified game players to play a golf game via the Internet. It is disclosed in Japanese Unexamined Patent Publication No. 2002-219282. In this video game device, a golf gaming server comprises transmitting means for receiving a notification of participation in an open tournament from each player and thereby transmitting a personal attribute information inputting screen, and can provide a wide variety of games to the players.

In addition to such a golf gaming system, various gaming systems are known. For example, a gaming system is known that provides a mah-jong game in which in response to the operations by the players, the contents of the game are displayed on each terminal connected via the Internet, so that the game is played as if a real mah-jong game is being played.

Real mah-jong is a table game using mah-jong tiles played normally by four players. First, 136 tiles each bearing a character or a graphical pattern are arranged facedown on a table. Among these tiles, 13 tiles each are delt as one's individual tiles to the players. Then, the players successively draw a tile from the pile of the tiles arranged facedown, so that a tile is added to the player's individual tiles, while an unnecessary tile is discarded face-up on the table. When a player accomplishes one of the predetermined combinations in the player's individual tiles, the game ends. During the game, in a special mode where a specific combination is achieved in the player's individual tiles by using the next specific kind of tile, the player may select to draw a tile from the tiles discarded by the other players, in addition to drawing a tile from the tiles arranged facedown. Such player's selections of operating by drawing a tile from the tiles discarded by the other players are classified into 'pon,' 'chii,' 'kan,' and the like.

According to this system for providing a mah-jong game, a real mah-jong game is simulated by a computer program so that the game progresses in a mode where the mah-jong tiles are displayed on each display device. Thus, in contrast to a real mah-jong game, the players can enjoy the mah-jong game without the necessity of gathering the members in a number necessary for the establishment of the mah-jong game. This also allows the players to enjoy a mah-jong game with unknown players in remote locations.

In such a system, a special mode for prompting a player to an operation of selection occurs depending on the game mode and the game contents of the player. When such a special mode occurs, a special interval is generated to stop a progress of the game and the player is prompted to an operation of selection, during the special interval. Thus, this generation of a special interval could have revealed to the other players that the game mode and the game contents are in such a situation that causes the occurrence of a special mode.

For example, in the mah-jong game, depending on the game mode and the game contents of a player, even when it is not the particular player's turn for drawing a tile, this player can engage in 'pon,' 'chii,' 'kan,' or the like so as to advance the game. At that time, a special mode described above occurs, and hence a special interval is generated.

The other players in the game are real players instead of virtual players acting under the control of the computer. Accordingly, these players can infer the occurrence of a special mode from the generation of the special interval. As such, the game mode and the game contents of a player are somewhat inferable. This indicates that the situation of a player can be revealed to the other players.

SUMMARY OF THE INVENTION

The invention has been devised by considering the above-mentioned matter. An object of the invention is to provide a gaming system capable of reducing the possibility that the game mode and the game contents of a player are revealed to the other players.

In order to achieve this object, the gaming system according to the invention comprises effect means for generating a dummy interval in a normal mode other than a special mode during a game, separately from a special interval generated in the special mode during the game.

More specifically, the invention provides the following systems.

(1) A gaming system for providing a game to a plurality of players, the gaming system comprising: a plurality of terminals operable by each of the plurality of the players; and a gaming server communicating with the plurality of the terminals, wherein the gaming server comprises a controller executing a computer program and controlling the plurality of the terminals, and wherein the controller generates a special interval for stopping a progress of the game in a special mode, and wherein the controller generates a dummy interval in a normal mode during the game.

(2) The gaming system according to claim 1, wherein the controller determines whether to generate the dummy interval.

According to Invention (1) or (2), a dummy interval is generated separately from a special interval generated of a special mode. This permits the providing of a game without allowing the players to recognize whether or not the situation is in a special mode.

This special mode is a concept indicating a mode which causes a special interval to be generated. In an example of a match-up mah-jong game, such special modes include 'pon,' 'chii,' 'kan,' and the like.

In the example of match-up mah-jong, in the related art gaming system, when such a special mode occurs, the generation of the special interval allows the other players to recognize that a player is in a special mode of 'pon,' 'chii,' or 'kan.' That is, the game mode of a player can be revealed to the other players.

In contrast, according to the present invention, a dummy interval is generated separately from a special interval generated in a special mode. This permits the providing of a game without allowing the players to recognize that a player is in a special mode.

(3) The gaming system according to (1) or (2), wherein the controller determines whether to generate the dummy interval based on an operation by at least one of the plurality of the players.

According to Invention (3), a dummy interval is generated separately from a special interval, depending on the operation of the players. Thus, in addition to the above-mentioned advantage, this configuration allows the plurality of players to bargain with each other, while not allowing the game mode and the game contents to be revealed to the other players. This permits a realistic game.

For example, when a dummy interval is generated outside the special mode, the players can infer that another player is in a certain game mode. This causes tactics in the game.

(4) The gaming system according to any one of (1) to (3), wherein the controller determines a length of the dummy interval.

According to Invention (4), the interval time of a dummy interval is determined, so that the effect is performed as if a special mode is cleared by another player. This permits the providing of a game, more strictly without allowing the players to recognize whether or not the situation is in a special mode.

(5) The gaming system according to (4), wherein the controller determines the length of the dummy interval based on an operation by at least one of the plurality of the players.

According to Invention (5), the interval time of a dummy interval is determined depending on the operation of the players. Thus, in addition to the above-mentioned advantage, this configuration allows the plurality of players to bargain with each other, while not allowing the game mode and the game contents to be revealed to the other players. This permits a realistic game.

(6) The gaming system according to any one of (1) to (5), wherein the game is a mah-jong game.

(7) A gaming system for providing a game to a plurality of players, the gaming system comprising: special interval means for generating a special interval for stopping a progress of the game in a special mode, dummy interval means for generating a dummy interval in a normal mode during the game.

(8) The gaming system according to (7), comprising:
a plurality of terminals operable by the plurality of players; and a gaming server capable of communicating with the plurality of the terminals, wherein the gaming server provides the game to the plurality of the players via each of the plurality of the terminals.

(9) The gaming system according to (7) or (8), wherein each of the plurality of the terminals is connected to the gaming server via a communications network.

The invention also provides the following systems.

(10) A gaming system according to any one of (7) to (9), comprising effect determining means for determining whether the dummy interval means generates the dummy interval.

(11) A gaming system according to (10), where the effect determining means determines whether the dummy interval means generates the dummy interval, based on an operation of any one of the plurality of the players.

(12) A gaming system according to any one of (7) to (11), wherein the effect determining means determines a length of the dummy interval generated by the dummy interval means.

(13) A gaming system according to any one of (7) through (12), wherein the effect determining means determines a length of the dummy interval, based on the operation of any one of the plurality of the players.

An example of the above-mentioned gaming system comprises: a plurality of terminals operable by a plurality of players; and a gaming server capable of communicating with a plurality of the terminals; so that the gaming server provides a game into which a plurality of players at a plurality of the terminals can participate. In this case, various functions may be built in a plurality of the terminals or in the gaming server.

The above-mentioned game is not limited to mah-jong, and may be another game such as various card games.

Other features and advantages of the invention will be apparent from the following description taken in connection with the accompanying drawings.

BRIEF DESCRIPTION OF THE DRAWINGS

FIG. 5 is a diagram illustrating the configuration of a database of a gaming server according to a preferred embodiment of the invention;

FIG. 11 is a diagram illustrating a display device of a gaming terminal according to an embodiment of the invention;

FIG. 12 is a diagram illustrating a display device of a gaming terminal according to an embodiment of the invention;

FIG. 13 is a diagram illustrating a display device of a gaming terminal according to an embodiment of the invention;

FIG. 14 is a diagram illustrating a display device of a gaming terminal according to an embodiment of the invention;

DETAILED DESCRIPTION OF THE INVENTION

A preferred embodiment of the invention is described below with reference to the drawings.

[System Configuration]

Figure 1:
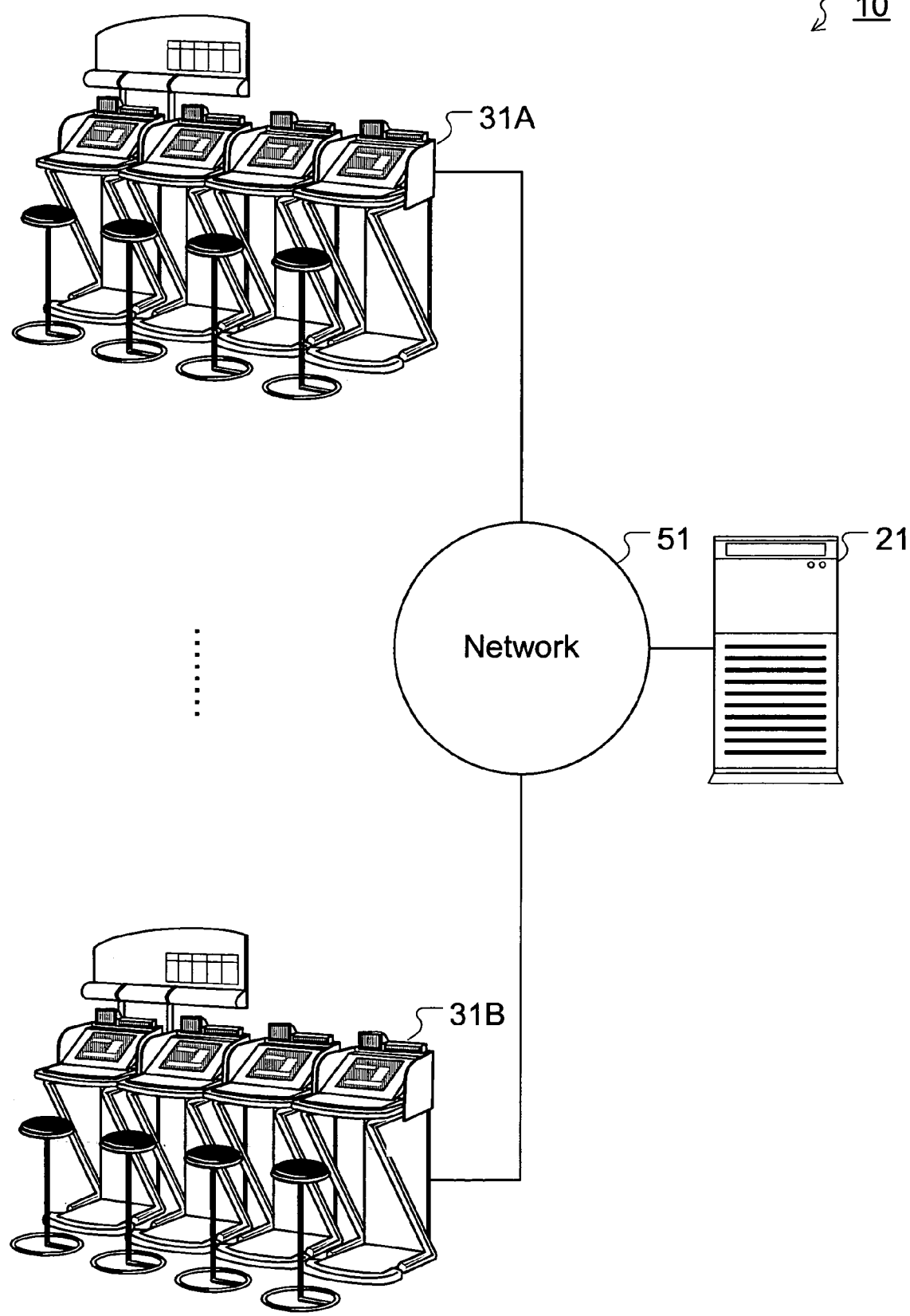
FIG. 1 is a schematic diagram showing the outline of a gaming system according to a preferred embodiment of the invention.

FIG. 1 is a schematic diagram showing the general configuration of a gaming system 10 according to a preferred embodiment of the invention.

In the gaming system 10 of FIG. 1, a gaming server 21 is connected through a network 51 to a plurality of gaming terminal groups 31A, 31B, . . . The network 51 is composed of the Internet, private lines, providers, audio communications stations, and base stations and communications satellite stations for portable phones, or the like. The gaming server 21 is connected via the network 51 for controlling the information on a game, so that the gaming server 21 can perform communications via the network 51.

In FIG. 1, the gaming server 21 is the only server connected to the network 51. However, the invention is not limited to this configuration. That is, the functions of the gaming server 21 may be divided and implemented in a plurality of servers.

A plurality of the gaming terminal groups 31A, 31B, . . . are connected to the network 51. Thus, a plurality of these gaming terminal groups 31A, 31B, . . . can have an access to the gaming server 21.

The gaming terminal groups 31A, 31B, . . . according to the present embodiment are game-dedicated gaming terminal groups. However, the invention is not limited to this configuration. That is, any type of terminals may be used as long as they allow the players to access the network 51. Thus, the gaming terminal groups 31A, 31B, . . . may be composed of various terminals, such as personal computers including desk-top personal computers, notebook personal computers, mobile personal computers, portable phones, and PDAs (Personal Digital Assistants).

The implementing method of access between the gaming terminal groups 31A, 31B, . . . and the network 51 such as the Internet (a host computer of a provider) is a dial-up PPP (Point-to-Point Protocol) communications in which packets generated according to TCP/IP protocols are exchanged. In the network 51 (between a host computer and the gaming server 21), communications are performed according to TCP/IP protocols. This configuration allows the gaming terminal groups 31A, 31B, . . . to obtain various information provided from the gaming server 21 and to provide various information to the gaming server 21.

In these communications, various communications schemes may be used. For example, major communications schemes used in portable phones and PDAs are TDMA (Time Division Multiple Access) scheme and CDMA (Code Division Multiple Access) scheme in which audio data is provided using radio waves according to these digital schemes. These radio waves are transmitted to the gaming server 21 via base stations distributed in various locations. Further, the communications lines that link the various devices in the network 51 may be cable lines or wireless lines.

In this embodiment, the gaming system is composed of the gaming server 21, the network 51, and the gaming terminal groups 31A, 31B, . . . However, the invention is not limited to this configuration. That is, another device may be included. For example, an accounting server may be included that manages the charges of the games.

In this embodiment, the gaming system is composed of the gaming server 21, the network 51, and the gaming terminal groups 31A, 31B, . . . However, the invention is not limited to this configuration. Since the invention is applicable as long as the players are real ones instead of virtual players controlled by a computer, the gaming server 21 may be omitted. Further, the gaming terminal groups 31A, 31B, . . . may be connected to each other in a manner permitting communications without the network 51. The functions of the gaming system 10 may be integrated into a single device, or alternatively implemented in separate devices.

[Configuration of Gaming Terminal Group]

Figure 2:
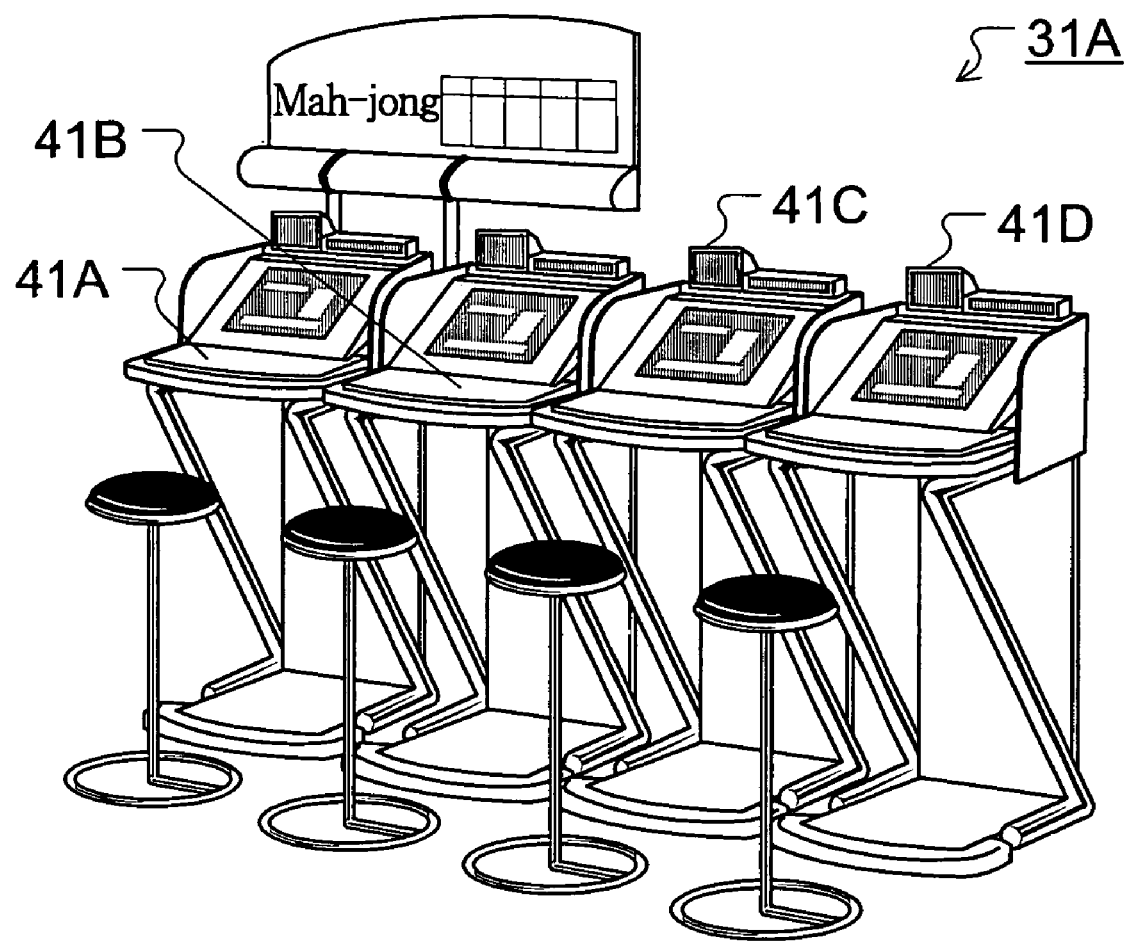
FIG. 2 is a schematic diagram showing the outline of gaming terminals according to a preferred embodiment of the invention.

FIG. 2 is a schematic diagram showing the general configuration of a gaming terminal group 31A according to a preferred embodiment of the invention. In FIG. 2, the gaming terminal group 31A is described as an example. However, the other gaming terminal groups 31B, have the same configuration, and hence description is omitted.

The gaming terminal group 31A of FIG. 2 is composed of a linkage of, for example, four gaming terminals 41 (41A-41D). The gaming terminal 41 can communicate with the gaming server 21 connected to the network 51 composed of the Internet, private lines, providers, audio communications stations, and base stations and communications satellite stations for portable phones, or the like.

In this embodiment, four gaming terminals 41 are linked. However, the invention is not limited to this configuration. That is, it is sufficient that the gaming terminals 41 can communicate with each other. Thus, a plurality of the gaming terminals may be constructed in linkage. Alternatively, each gaming terminal may be constructed as a stand-alone without such linkage.

[Configuration of Gaming Terminal]

Figure 3:
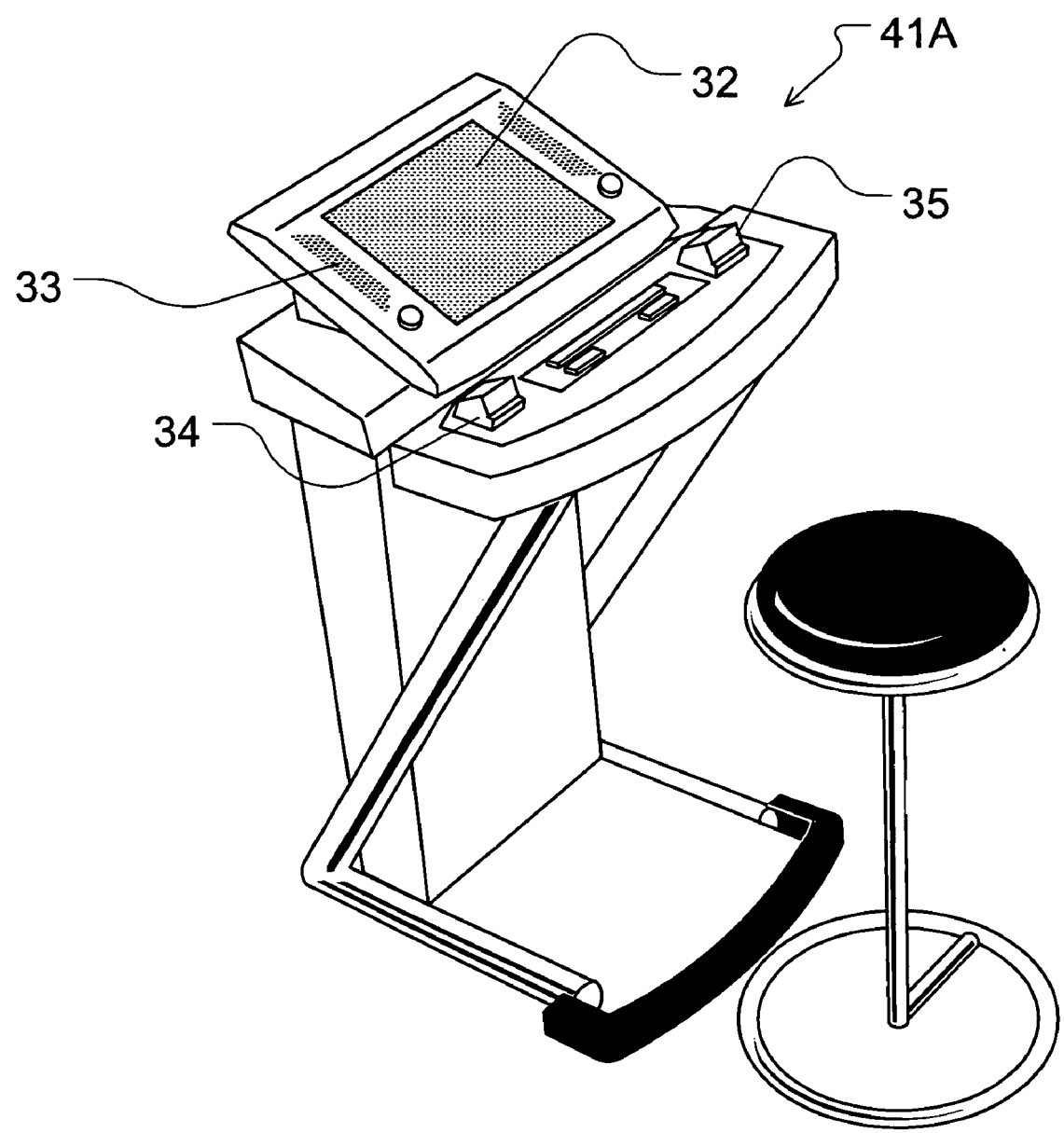
FIG. 3 is a schematic diagram showing the outline of a gaming terminal according to a preferred embodiment of the invention.

FIG. 3 is a schematic diagram showing the configuration of a gaming terminal 41A according to a preferred embodiment of the invention. In FIG. 3, the gaming terminal 41A is described as an example. However, the other gaming terminals 41B, 41C, and 41D have the same configuration, and hence description is omitted.

The gaming terminal 41A of FIG. 3 comprises a display device 32 facing to a player. A display screen 32a thereof displays an image relevant to the game.

The surface of the display device 32 is provided with a touch sensor 82 (see FIG. 8) for permitting various operations of the game depending on the position and the timing of the touch.

The gaming terminal 41A further comprises a speaker 86 (see FIG. 8) for generating sound through speaker grills 33 provided on both sides of the display device 32.

A insertion opening 34 into which a rewritable magnetic card 89 for player identification is inserted and removed therefrom is provided on the player side (in the direction where a chair is illustrated) of the display device 32. A card reader 83 (see FIG. 8) built in the gaming terminal 41A reads the identification information recorded in the rewritable magnetic card 89 (see FIG. 9).

In this embodiment, the card reader 83 reads the identification information for player identification. However, the invention is not limited to this configuration. Any type of device may be used as long as it permits the input of the identification information for player identification. The methods of player identification include: password identification using the input of a password or the like; fingerprint identification in which the fingerprint of a player is read; and iris identification in which the iris pattern of a player is read.

A coin inlet 35 into which a coin for the game charge is inserted is provided on the player side (in the direction where a chair is illustrated) of the display device 32. The coin is detected by a coin detection sensor 81 (see FIG. 8) built in the gaming terminal 41A.

The gaming terminal 41A further comprises an effect lamp 85 (see FIG. 8) which turns on and off depending on the game result and the game contents.

In this embodiment, a gaming system for providing a mah-jong game is employed. Thus, the effect is performed only when the game has finished and the game result is obtained. However, the invention is not limited to this configuration. In addition to the game result, the effect lamp may be driven on the basis of the game mode, the game situation, the game history, and the game contents. Alternatively, the effect lamp may be omitted.

[Electrical Configuration of Gaming Server]

Figure 4:
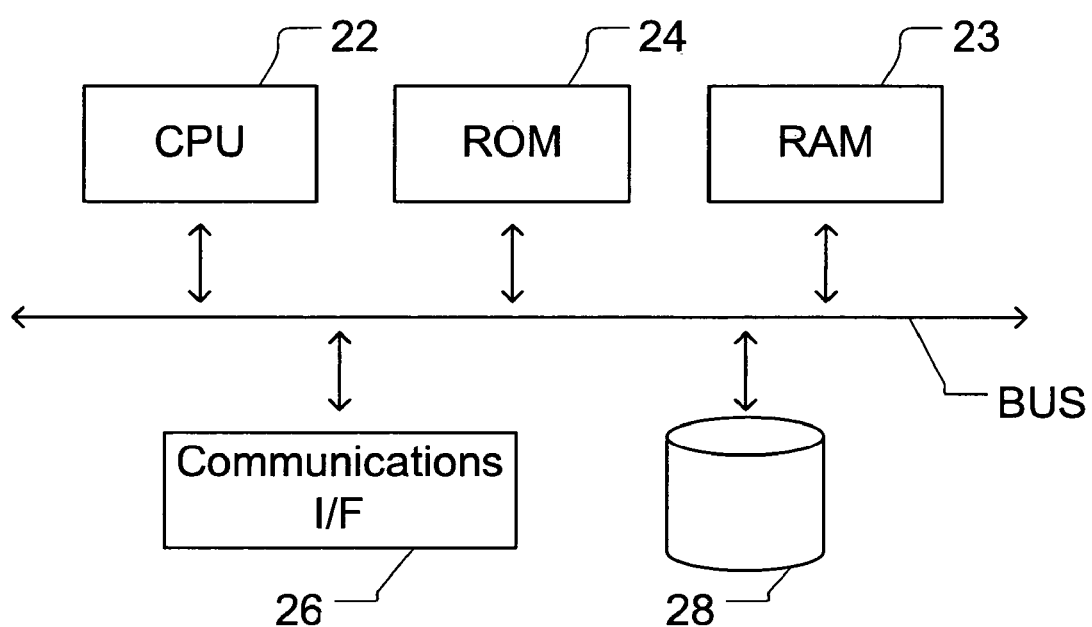
FIG. 4 is a block diagram showing the electrical configuration of a gaming server according to a preferred embodiment of the invention.

FIG. 4 is a block diagram showing a control circuit of the gaming server 21 according to a preferred embodiment of the invention.

As shown in FIG. 4, in the gaming server 21, a data bus links a CPU 22, a RAM 23, a ROM 24, a communications interface circuit 26, and a storage unit 28 composed of RAID (Redundant Arrays of Inexpensive Disks).

In the description of this embodiment, the gaming server 21 has only a minimum required configuration. Other various devices may be connected to this configuration, so that various functions may be added.

For example, a random number generator for generating a random number may be connected to this configuration, so that various determination processes described later may be performed on the basis of the random number generated by the random number generator. However, in this embodiment, the random number is generated by the CPU 22 according to a program stored in the ROM 24.

The ROM 24 of the gaming server 21 stores programs for providing various services. These programs include a program for managing the gaming system 10 of FIG. 1, more specifically, a program for performing the communications with the gaming terminal groups 31A, 31B, . . .

In the description of this embodiment, the ROM 24 stores the programs. However, the invention is not limited to this configuration. The storage unit 28 may store the programs. Further, the programs may be stored in both of the ROM 24 and the storage unit 28.

The CPU 22 performs various operations according to these programs stored in the ROM 24. The CPU 22 stores programs themselves, program-generated variables, and data temporarily into the RAM 23, and controls various circuit units depending on the operations. As described later in detail, the CPU 22 performs various processes on the basis of various contents stored in the storage unit 28 according to the control programs. That is, the CPU 22 receives information transmitted from the gaming terminal groups 31A, 31B, . . . via the network 51 and via the line connected to the communications interface circuit 26, and then stores the information into the RAM 23 and the storage unit 28.

[Configuration of Storage Unit of Gaming Server]

The storage unit 28 further stores a personal attribute information database as shown in FIG. 5.

In the personal attribute information database, personal attribute information used for the game is stored in a correlating manner. Various items such as "ID," "name," "password," "address," "identification information," "e-mail," and "personal game history file" are correlated with each other.

In this embodiment, a communications destination database for registering identification information for identifying the gaming terminal groups 31A, 31B, . . . is stored in the storage unit 28 as a single item. By referring to this communications destination database, the communications with the gaming terminal 41 is possible.

In this embodiment, a participating player database regarding players who can participate in the game is further stored in the storage unit 28. As described later, in determination of the player group of a game, a plurality of players are selected from the players who can participate in the game. This database is renewed at the time of authentication of a player.

In the description of this embodiment, the storage unit 28 stores the personal attribute information database of FIG. 5, the communications destination database, and the participating player database. However, the invention is not limited to this configuration. That is, the personal attribute information database need not necessarily be stored. Further, another database may be stored.

[Electric Configuration of Gaming Terminal]

Figure 6:
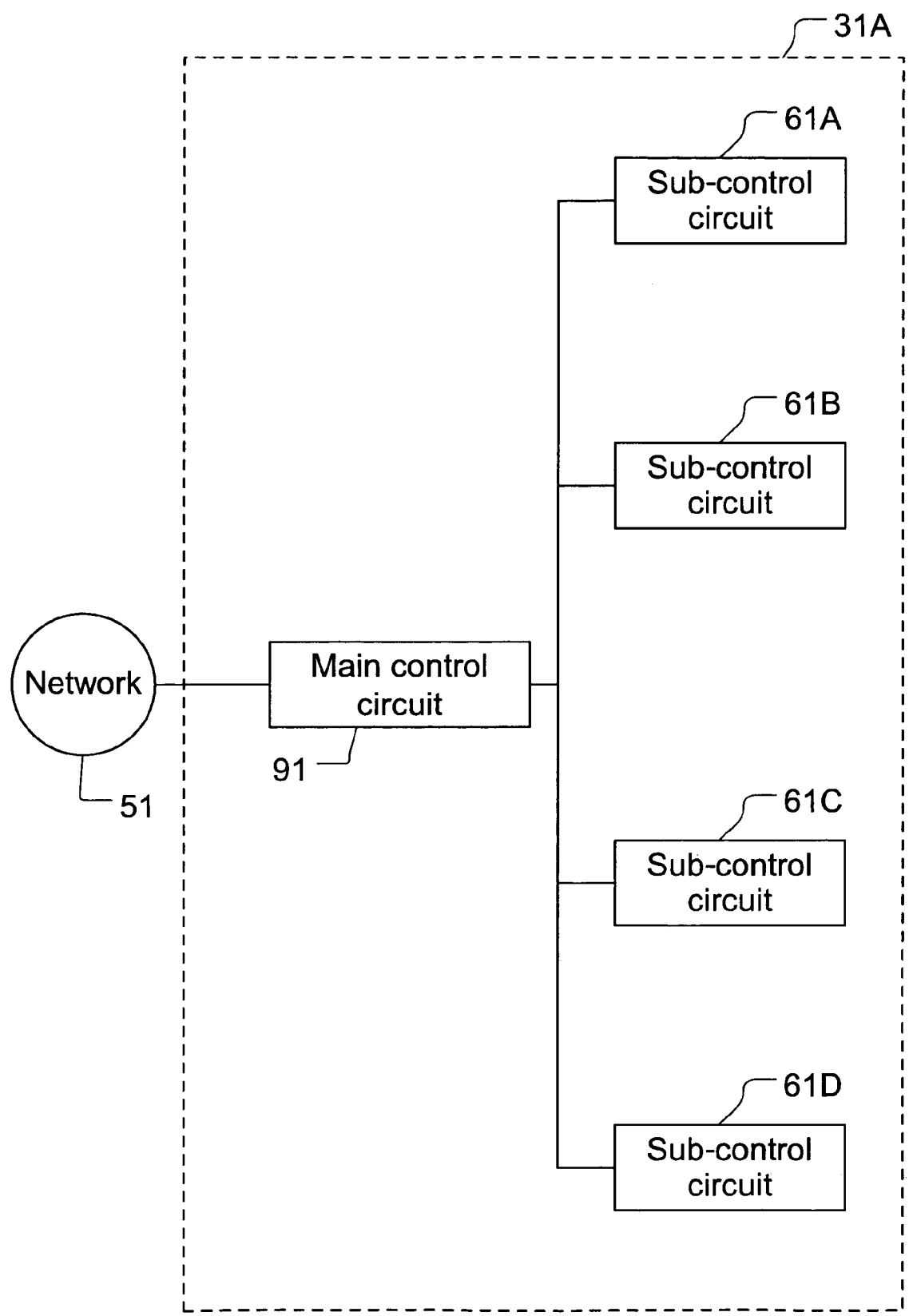
FIG. 6 is a block diagram showing the electrical configuration of gaming terminals according to a preferred embodiment of the invention.

FIG. 6 is a block diagram showing a control circuit of a gaming terminal group 31 according to a preferred embodiment of the invention.

In the gaming terminal group 31, a main control circuit 91 is connected to a plurality of sub-control circuits 61 (61A-61D) in a mode permitting communications.

The main control circuit 91 links a plurality of the sub-control circuits 61 with the gaming server 21 via the network 51 in a mode permitting communications. The main control circuit 91 further links a plurality of the sub-control circuits 61 with each other in a mode permitting communications. Details are described later.

The sub-control circuit 61 is built in each gaming terminal 41, and connected to other gaming terminals 41 via the main control circuit 91 in a mode permitting communications. The sub-control circuit 61 is connected to the gaming server 21 via the main control circuit 91 and the network 51 in a mode permitting communications. Further, the sub-control circuit 61 can be connected to another gaming terminal group 31 via the gaming server 21 in a mode permitting communications. In this case, the sub-control circuit 61 is connected to another gaming terminal 41 in another gaming terminal group 31. Details are described later.

[Electrical Configuration of Gaming Main Control Circuit]

Figure 7:
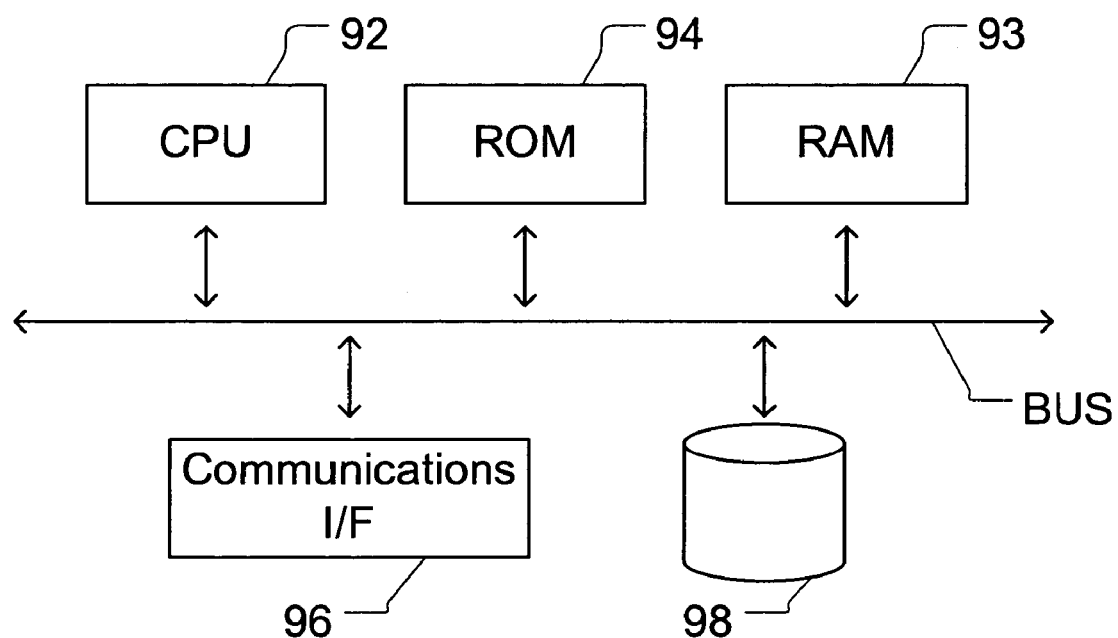
FIG. 7 is a block diagram showing the electrical configuration of a gaming terminal according to a preferred embodiment of the invention.

FIG. 7 is a block diagram showing the electrical configuration of a gaming main control circuit 91 according to a preferred embodiment of the invention.

As shown in FIG. 7, in the main control circuit 91, a data bus links a CPU 92, a RAM 93, a ROM 94, a communications interface circuit 96, and a storage unit 98 composed of RAID (Redundant Arrays of Inexpensive Disks).

In the description of this embodiment, the main control circuit 91 has only a minimum required configuration. Other various devices may be connected to this configuration, so that various functions may be added.

For example, a random number generator for generating a random number may be connected to this configuration, so that various determination processes described later may be performed on the basis of the random number generated by the random number generator.

The ROM 94 of the main control circuit 91 stores programs for providing various services. These programs include a program for establishing a link to the gaming server 21 of FIG. 1 in a mode permitting communications and a program for establishing a link between a plurality of the sub-control circuits 61.

In the description of this embodiment, the ROM 94 stores the programs. However, the invention is not limited to this configuration. The storage unit 98 may store the programs. Further, the programs may be stored in both of the ROM 94 and the storage unit 98.

In the description of this embodiment, a plurality of the sub-control circuits 61 are connected to the gaming server 21 indirectly via the main control circuit 91, and hence the main control circuit 91 intensively controls the communications lines of a plurality of the sub-control circuits 61. However, the present invention is not limited to this configuration. That is, a plurality of the sub-control circuits 61 may be connected directly to the network 51. In this case, the main control circuit 91 may be omitted.

The CPU 92 performs various operations according to these programs stored in the ROM 94. The CPU 92 stores programs themselves, program-generated variables, and data temporarily into the RAM 93, and controls various circuit units depending on the operations.

In this embodiment, the CPU 92 can communicate with a plurality of the sub-control circuits 61A, 61B, . . . , 61D and with the network 51 via the communications interface circuit 96. The storage unit 28 stores a communications destination database for registering identification information for identifying the sub-control circuits 61A, 61B, . . . , 61D and the gaming server 21. Thus, the CPU 92 refers to this communications destination database, so as to permit communications between the gaming terminals 41 and between each gaming terminal 41 and the gaming server 21.

[Electrical Configuration of Sub-control Circuit]

Figure 8:
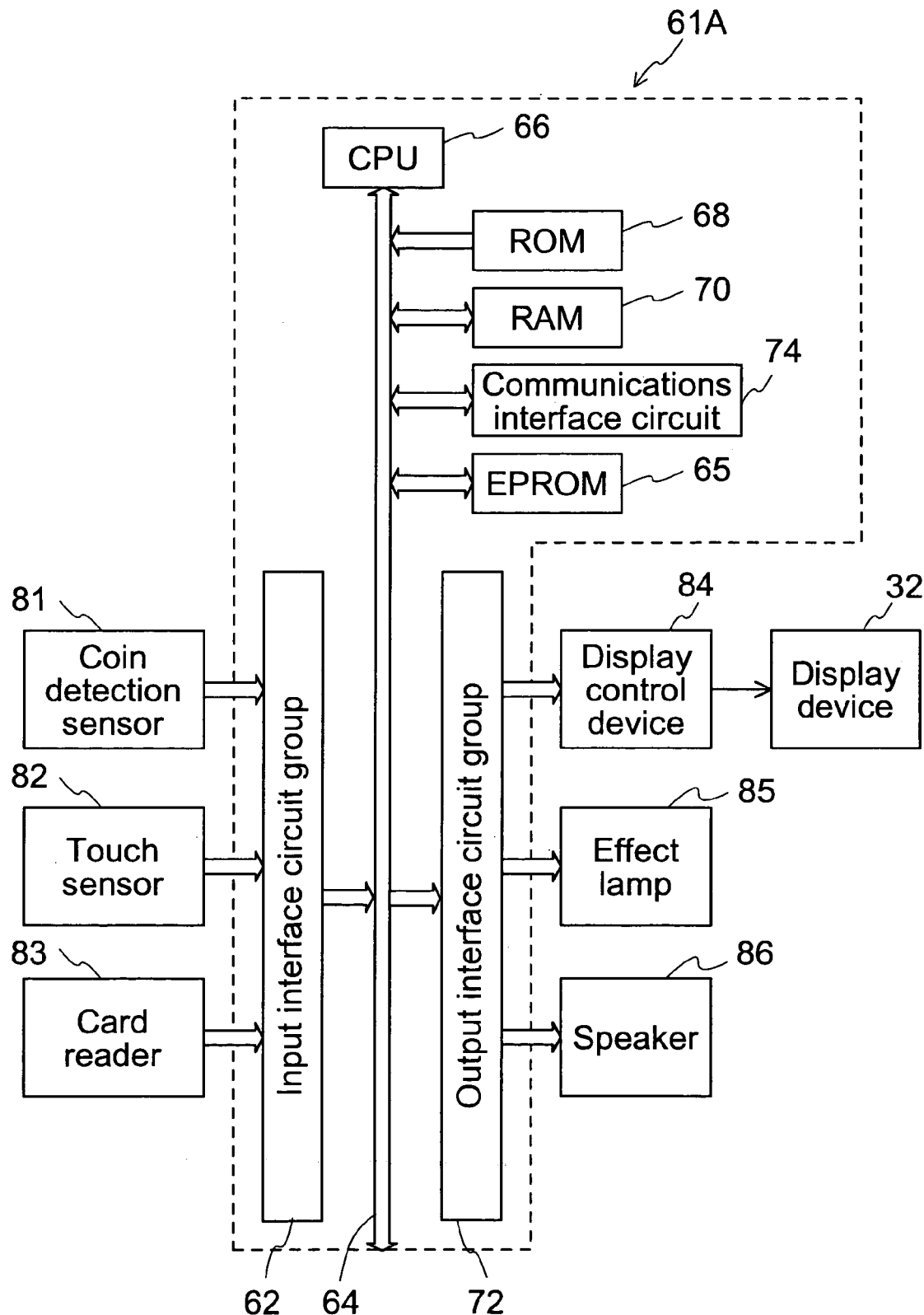
FIG. 8 is a block diagram showing the electrical configuration of a gaming terminal according to a preferred embodiment of the invention.

FIG. 8 is a block diagram showing the electrical configuration of the sub-control circuit 61 according to a preferred embodiment of the invention.

The coin detection sensor 81 described above is connected to an input output interface circuit group 62 of the sub-control circuit 61A. The input output interface circuit group 62 is connected to an I/O bus 64. The coin detection sensor 81 detects a coin inserted through the coin inlet 35. When detecting a coin, the coin detection sensor 81 provides a predetermined detection signal to the input output interface circuit group 62. On receiving the predetermined detection signal, the input output interface circuit group 62 converts the signal into predetermined detection information, so as to provide the predetermined detection information to the I/O bus 64. The I/O bus 64 interprets the input or output of data signals and address signals to and from the CPU 66.

The CPU 66 further comprises a timer (not shown) described later.

The touch sensor 82 provided in the display device 32 is also connected to the input output interface circuit group 62.

The touch sensor 82 transmits a touch detection signal indicating the detection of touch by a finger of the player, to the input output interface circuit group 62. This signal is then provided to the I/O bus 64.

The card reader 83 is also connected to the input output interface circuit group 62. When detecting the rewritable magnetic card 89 (see FIG. 9) for player identification, the card reader 83 reads various information such as identification information from the rewritable magnetic card 89, so as to provide read-out of various information to the input output interface circuit group 62.

The I/O bus 64 further links a ROM (read only memory) 68 and a RAM (random access memory) 70. The ROM 68 stores a control program for controlling the overall flow of the game in the sub-control circuit 61A. The ROM 68 further stores: initial data used in the execution of the control program; a program for controlling the blinking operation pattern of the effect lamp 85; a program for controlling the display on the display device 32; a program for controlling the sound from the speaker 86; and the like.

In particular, in this embodiment, the stored control program is such that generates a dummy interval when a touch occurs at a predetermined position on the touch sensor 82 at a predetermined timing.

The RAM 70 stores the values of flags and variables used in the above-mentioned programs.

The I/O bus 64 further links an input output interface circuit group 72. The input output interface circuit group 72 is connected to a display control device 84, the effect lamp 85, and the speaker 86. The input output interface circuit group 72 provides driving signals and driving power, so as to control these devices depending on the result of the CPU 66.

The I/O bus 64 current links an EPROM 65. The EPROM 65 is a device into which information can be written, and stores various kinds of information.

In the description of this embodiment, the sub-control circuit 61A has only a minimum required configuration. Other various devices may be connected to this configuration, so that various functions may be added.

For example, a random number generator for generating a random number may be connected to this configuration, so that various determination processes described later may be performed on the basis of the random number generated by the random number generator. However, in this embodiment, the random number is generated by the CPU 66 according to a program stored in the ROM 68.

The I/O bus 64 further links a communications interface circuit 74. The communications interface circuit 74 permits communications with the gaming server 21 via the main control circuit 91, the network, and the like.

The CPU 22, the CPU 92, the CPU 66, and the peripheral devices thereof serve as a controller of the gaming system. They also serve as various pieces of means such as effect means and effect determining means for providing the functions according to this embodiment.

[Description of Game]

The mah-jong game provided to the players in the above-mentioned configuration is described below with reference to FIG. 9 to FIG. 14.

Figure 9:
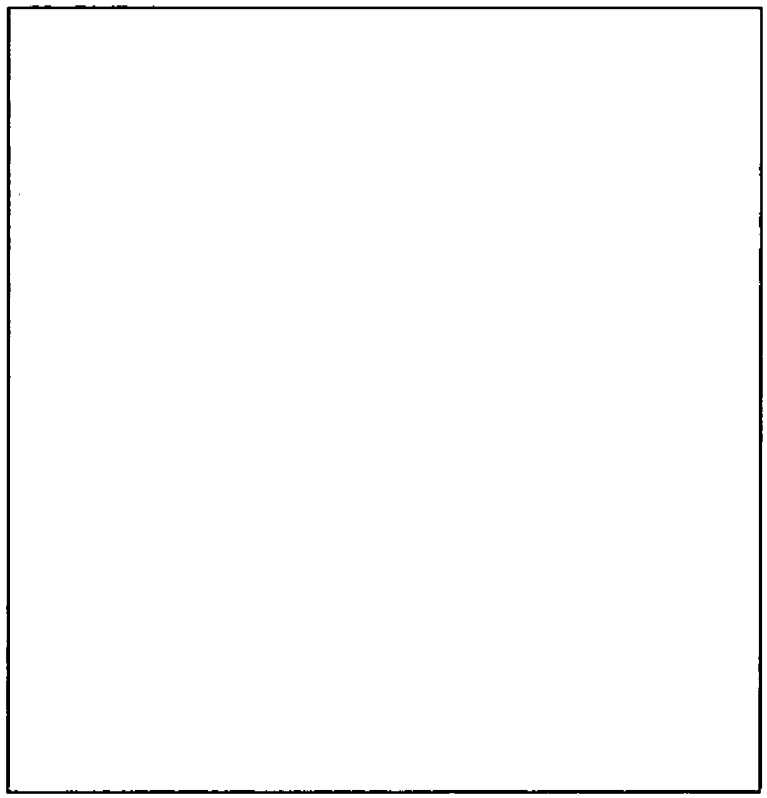
FIG. 9 is a diagram illustrating a rewritable magnetic card according to an embodiment of the invention.

The rewritable magnetic card 89 of FIG. 9 is used for player identification, and stores the identification information of a player. In order to start a game, the player inserts the rewritable magnetic card 89 into the insertion opening 34. This operation allows the player to start the game. It should be noted that the game actually starts when the rewritable magnetic card 89 is inserted into the insertion opening 34 and when a coin is inserted into the coin inlet 35.

Figure 10:
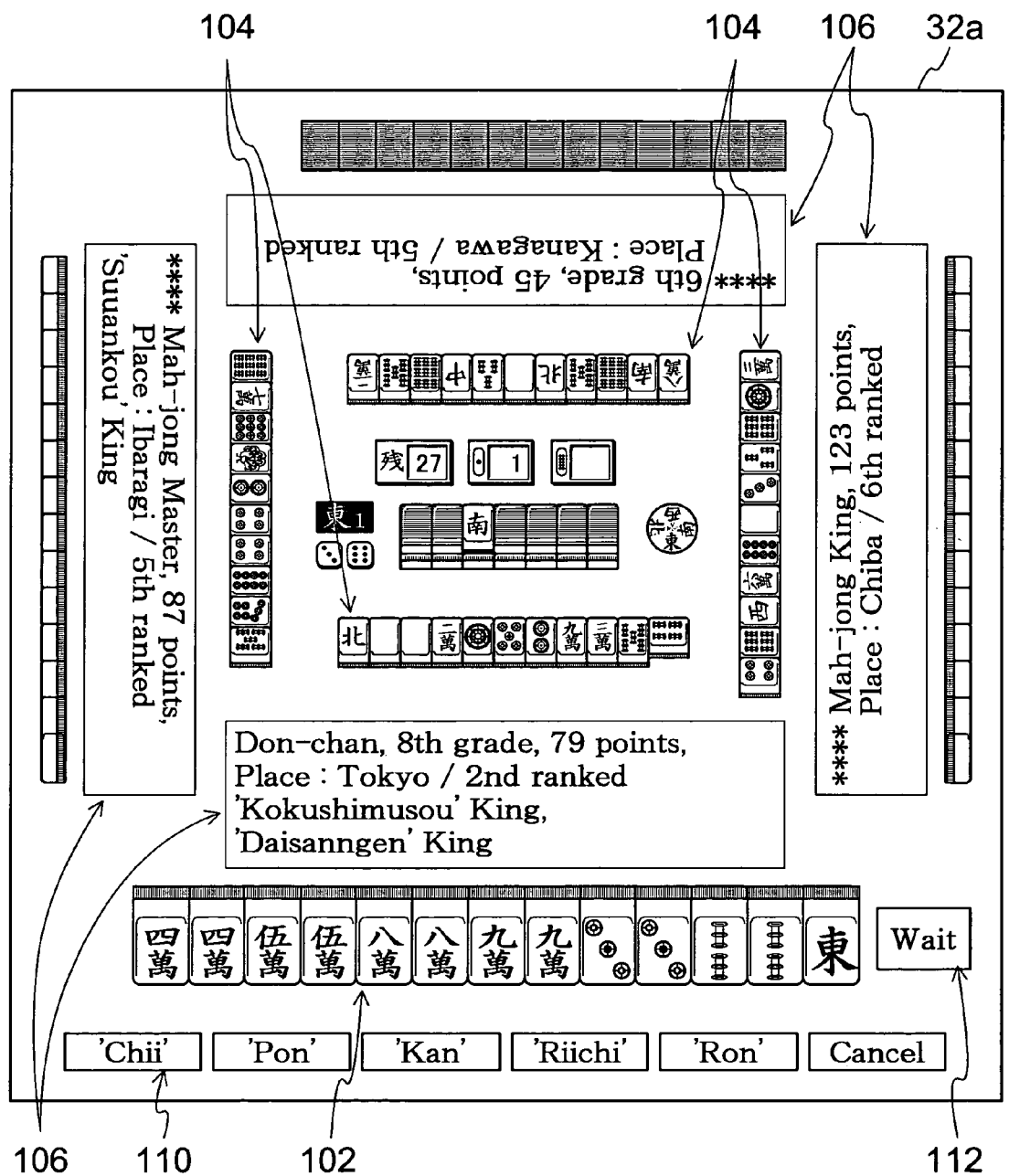
FIG. 10 is a diagram illustrating a display device of a gaming terminal according to an embodiment of the invention.

FIG. 10 shows an example of game contents displayed on the display screen 32*a*. This mah-jong game is a four-player mah-jong game as shown in FIG. 10. This mah-jong game is played in two distinct modes. In a within-a-game-arcade mode, the game is played among the gaming terminals within the gaming terminal group 31A or among the gaming terminals within the gaming terminal group 31B. In an on-line mode, the game is played among a plurality of the gaming terminal groups 31A, 31B, . . . via the gaming server 21. One of the modes is selected by operation of the player.

As shown in FIG. 10, the display screen 32*a* displays mah-jong tiles. Individual tiles 102 and discarded tiles 104 are displayed in such a mode where the graphical patterns on the tiles are visible.

Information 106 relevant to the four players is also displayed. This allows the players to read such information and know the details of the other players. This permits the providing of a game with reality.

Button images 110 indicating 'chii,' 'pon,' 'kan,' 'riichi,' 'ron,' "cancel," and the like are displayed in the bottom of the display screen 32*a*. In the duration that these button images are displayed, when a button image is touched, the touch sensor 82 detects touch of the position, so as to provide a predetermined touch signal to the CPU 66.

In the actual mah-jong game, 'chii,' 'pon,' or 'kan' can be selected in response to a tile discarding performed by another player. In this case, only in a predetermined limited duration, the latest discarded tile is displayed in a blinking mode, so that the player is prompted to an operation. This mode corresponds to a "special mode," while the interval of the predetermined duration for prompting the player to an operation corresponds to a "special interval."

A "wait" button image 112 is displayed above the "cancel" button image. In the duration that the "wait" button image is displayed, when the "wait" button image is touched, the touch sensor 82 detects touch of the position, so as to provide a predetermined touch signal to the CPU 66.

In this case, regardless of whether or not the situation is in a special mode, an "dummy interval" imitating the above-mentioned "special interval" can be generated by the operation of the player.

As such, a dummy interval is generated separately from a special interval generated in the special mode. This permits the progress of the game without allowing the other players to recognize whether or not the present player is in an actual special mode.

For example, in a related art mah-jong gaming system, when a special mode of 'pon,' 'chii,' or 'kan' occurs, a corresponding special interval is generated. This allows the other players to recognize that the present player is in a special mode. The game mode of a player is revealed to the other players.

In the configuration of this embodiment, an imitating dummy interval is generated separately from a special interval generated in the special mode. This permits the providing of the game without allowing the players to recognize that a player is in a special mode.

Further, a dummy interval is generated in response to the operation of the player. Thus, in addition to the above-mentioned advantage, this configuration allows the plurality of players to bargain with each other. This permits a realistic mah-jong game.

For example, when a dummy interval is generated outside the special mode, the other players can infer that the present player is in a certain game mode. This causes tactics in the game.

The (time) length of the dummy interval is adjusted by the duration that the player maintains the touch to the "wait" button image 112. In this embodiment, the length of the dummy interval is adjusted by the duration that the player maintains the touch to the "wait" button image. However, the invention is not limited to this configuration. Another method of operation may be used. For example, a touch may generate a dummy interval, and the next touch may clear the dummy interval.

This configuration permits the adjustment of the interval length of the dummy interval, so that the game resumes as if the other player has cleared the special mode. This can make recognizing of the special mode even harder for the players.

Further, the length of the dummy interval is determined based on the operation of the players. Thus, in addition to the above-mentioned advantage, this configuration allows the plurality of players to bargain with each other. This permits a realistic game.

Further, the number of times of allowed dummy interval generation may be limited, so that the generation of a dummy interval is forbidden when the number of times has been reached. This avoids unlimited delay in the game, and still permits a game with tactics among the players under an even condition.

Furthermore, the number of limited times may be determined on the basis of various game results and game contents or on the basis of the result of a lottery. This permits the providing of a chance-dependent game, and allows the players to enjoy the game regardless of their game skills. The number of limited times may be determined on the basis of the length of the previous dummy interval generation.

In this mah-jong game, various kinds of information are generated on the basis of the game result of the players.

For example, the mah-jong game is played as a competition for jewels on the basis of the game history or the game result. In this case, as shown in FIG. 11, the information of a player is displayed as "birthstone," "a number of acquired jewels," "a number of birthstones of emerald," and "credit point count."

The birthstone is determined from the birth date information intrinsic to the player as shown in FIG. 12. For example, the birthstone of a player born in May is emerald. When the birthstones are converted into credit points, three times of the number is counted as the points. Accordingly, when the number of acquired jewels is 67 including five birthstones of emerald, that is, when the number of birthstones is 5 and the number of jewels other than the birthstone is 62, the points 5×3+62×1=77 are counted.

As shown in FIG. 13, on the basis of the credit point count, the player receives a class or grade and a title. As shown in FIG. 10, a class or grade and a title such as "8th grade" is displayed on the display screen 32*a*. As such, the player's game skill is clarified. This enhances the player's desire of entry into the game. Further, the other players' game skill is known. This permits the providing of a game for which the players enjoy more.

Depending on the credit point count, ranking can be displayed on the display screen 32*a* as shown in FIG. 14. As such, the player's game skill is further clarified. This enhances the player's will of entry into the game. Further, the other players' game skill is known. This permits the providing of a game for which the players enjoy more.

[Operation of Gaming System]

Subroutines which control the gaming system 10 and which are executed in various circuits including the gaming server 21, the main control circuit 91, and the sub-control circuit 61 are shown in FIG. 15 to FIG. 20.

Figure 15:
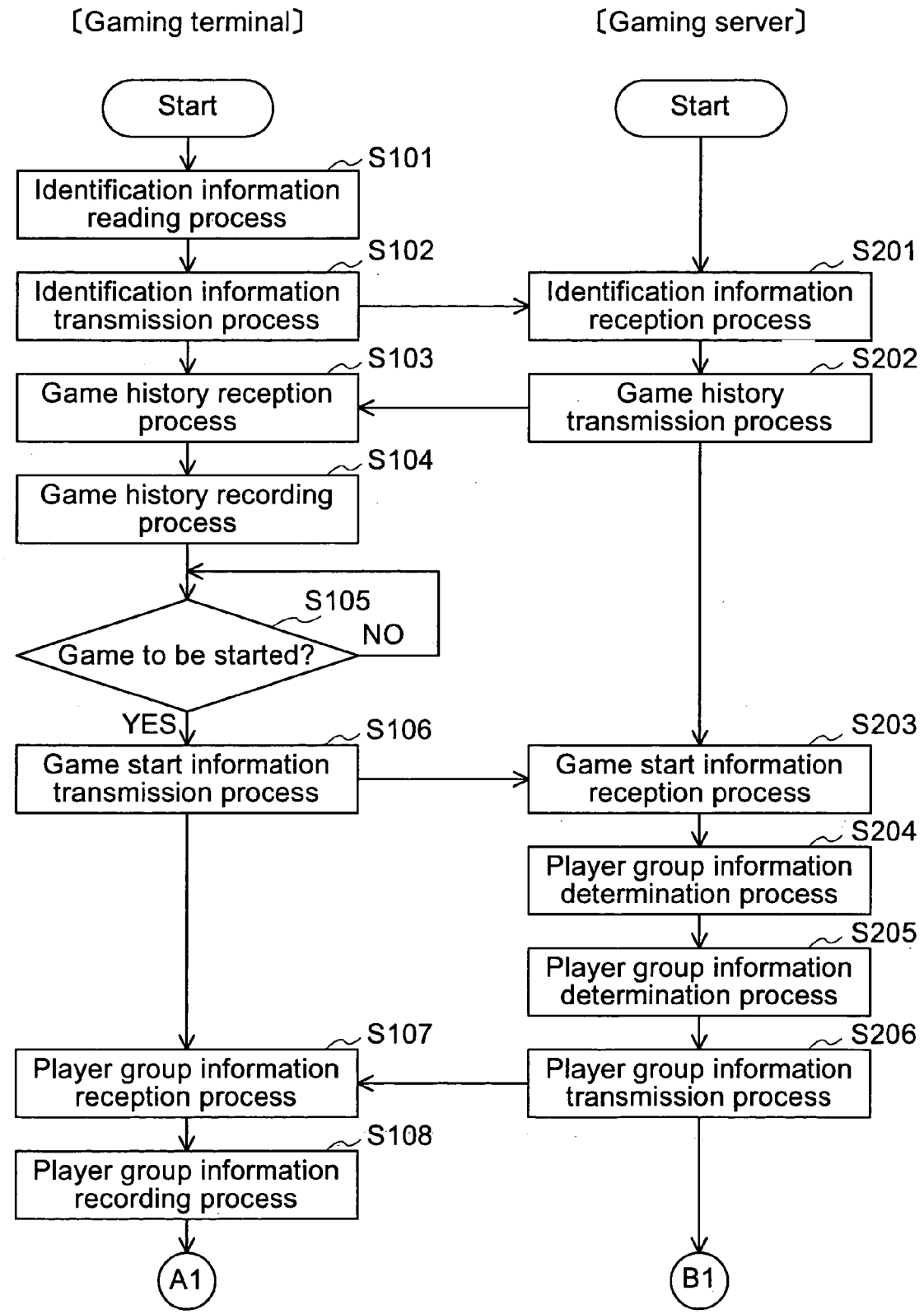
FIG. 15 shows a flowchart of a control process performed in a gaming system according to a preferred embodiment of the invention.

First, as shown in FIG. 15, in the gaming terminal 41A, the CPU 66 performs an identification information reading process (step S101). In this process, the card reader 83 reads various information such as identification information stored in the rewritable magnetic card 89, and then provides the read-out information through the input output interface circuit group 62 to the CPU 66. The CPU 66 receives this information, and then records it into the RAM 70. On completion of this process, the procedure moves to step S102.

Then, in the gaming terminal 41A, an identification information transmission process is performed (step S102). In this process, the CPU 66 transmits the identification information having been recorded into the RAM 70 in step S101, to the gaming server 21 via the communications interface circuit 74, the main control circuit 91, and the network 51. On completion of this process, the procedure moves to step S103. In the following description, the description of communications control in the main control circuit 91 is omitted.

On the other hand, in the gaming server 21, the CPU 22 performs an identification information reception process (step S201). In this process, the CPU 22 receives via the communications interface circuit 26 the information containing the identification information having been transmitted in step S102, and then records the information into the RAM 23. On completion of this process, the procedure moves to step S202.

Then, in the gaming server 21, a game history transmission process is performed (step S202). In this process, the CPU 22 reads game history information from a personal game history file in the personal attribute information database stored in the storage unit 28, and then provides the information to the game control circuit 61A via the communications interface circuit 26 and the network 51. On completion of this process, the procedure moves to step S203.

Then, in the gaming terminal 41A, a game history reception process is performed (step S103). In this process, the CPU 66 receives via the communications interface circuit 74 the game history information having been transmitted in step S202, and then records the information into the RAM 70. On completion of this process, the procedure moves to step S203.

Then, in the gaming terminal 41A, a game history recording process is performed (step S104). In this process, the CPU 66 reads the game history information having been recorded into the RAM 70 in step S103, and then records the information into the EPROM 65. On completion of this process, the procedure moves to step S105.

Then, in the gaming terminal 41A, it is determined whether or not the game is to be started (step S105). In this process, in response to a player's operation or alternatively by automatic operation of starting the game, the CPU 66 advances the procedure to step S106 so as to generate game start information indicating the game start, and then transmits the information to the gaming server 21 (step S106). On completion of this process, the procedure moves to step S107.

On the other hand, in the gaming server 21, a game start information reception process is performed (step S203). In this process, the CPU 22 receives the game start information having been transmitted in step S106, and then records the information into the RAM 23.

Then, in the gaming server 21, a player group determination process is performed (step S204). In this process, the CPU 22 generates information of a player group comprising four players, and then records the information into the storage unit 28. The CPU 22 further determines the order of the players in the player group determined in step S204, and then records the information indicating the order of players, into the RAM 23 (step S205). Then, the CPU 22 transmits the information indicating the player group and the order of the players, to the gaming terminal 41A via the network 51 and the like (step S206). Here, the four players constituting the player group may be composed of four real players or may include virtual players acting under the control of the computer. On completion of this process, the procedure moves to step S210.

On the other hand, in the gaming terminal 41A, a player group reception process is performed (step S107). In this process, the CPU 66 receives via the communications interface circuit 74 the information indicating the player group and the information indicating the signals of the players having been transmitted in step S205, and then records the information into the RAM 70 (step S108). On completion of this process, the procedure moves to step S111 or step S311. The processes described above are common to a plurality of the gaming terminals 41A and the like. In the following description, two distinct kinds of processes are explained separately in two distinct flows. However, for simplicity, common portions to these two flows are described only in one flow.

Figure 16:
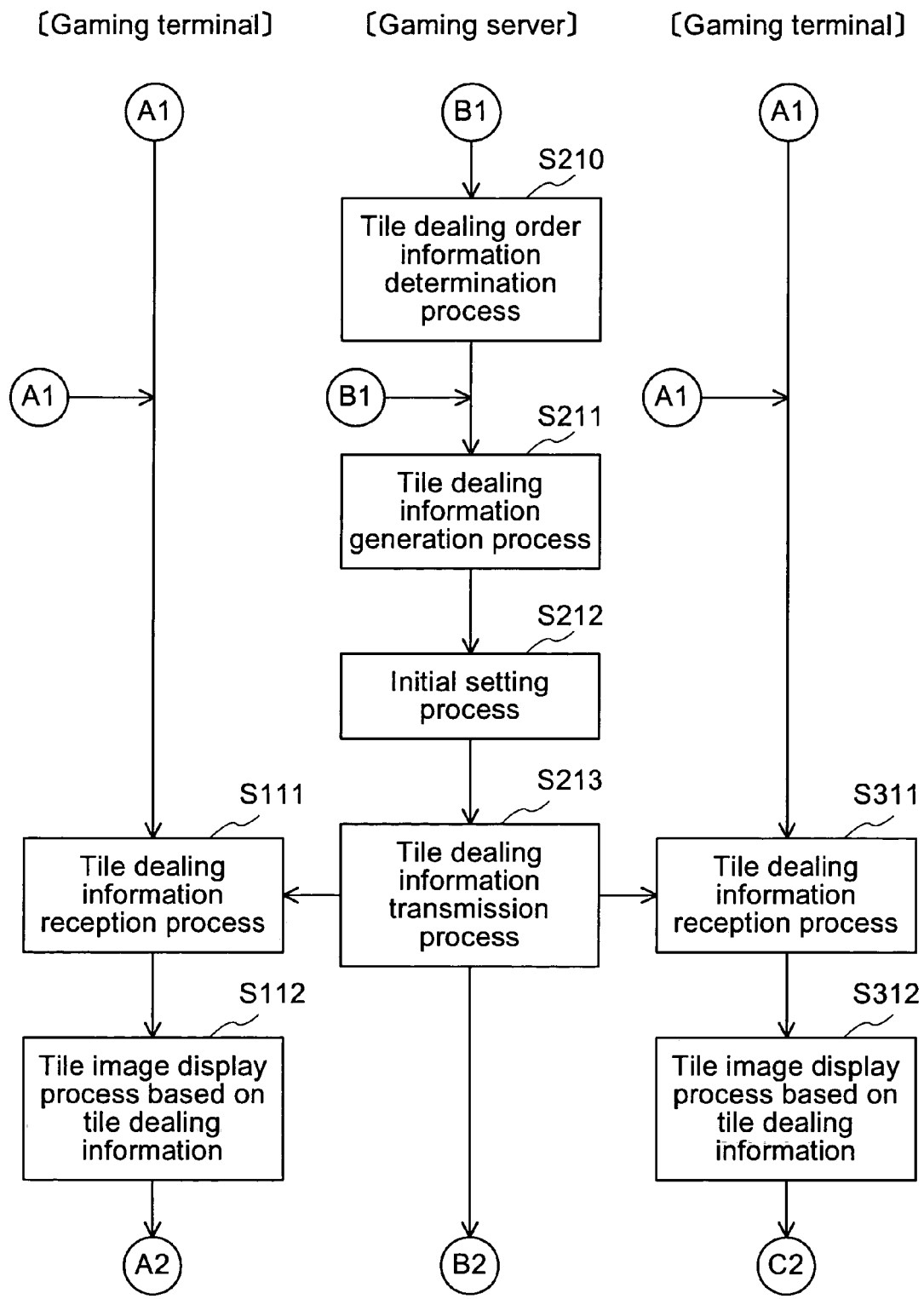
FIG. 16 shows a flowchart of a control process performed in a gaming system according to a preferred embodiment of the invention.

As shown in FIG. 16, in the gaming server 21, a tile dealing order information determination process is performed (step S210). In this process, on the basis of the order of the players having been determined in step S205, the CPU 22 determines tile dealing order information, and then records the information into the RAM 23. This tile dealing order information indicates the order of dealing the mahjong tiles. On completion of this process, the procedure moves to step S211.

Then, in the gaming server 21, a tile dealing information generation process is performed (step S211). In this process, the CPU 22 generates random numbers according to a program so as to generate tile dealing information on the basis of the random numbers, and then records the information into the RAM 23. This tile dealing information determines the tiles to be dealt to each player. In this embodiment, a series of tiles to be dealt are determined in advance at the beginning of the game. However, the invention is not limited to this configuration. That is, the tile may be determined at the time when each tile is dealt to the player. On completion of this process, the procedure moves to step S212.

Then, in the gaming server 21, an initial setting process is performed (step S212). In this process, the CPU 22 records the initial setting information positioned in the RAM 70 for performing various initial settings relevant to the game. This initial setting information is set at each game turn, and includes various information, such as information used for storing the information of each player's dealt tiles in a mode corresponding to each of the players. On completion of this process, the procedure moves to step S213.

Then, in the gaming server 21, a tile dealing information transmission process is performed (step S213). In this process, the CPU 22 transmits the tile dealing information having been generated in step S212, to the gaming terminal 41A and the like used by the players determined as the player group. On completion of this process, the procedure moves to step S221.

In the gaming terminal 41A and the like, a tile dealing information reception process is performed (step S111). In this process, the CPU 66 receives the tile dealing information having been transmitted by the gaming server 21 in step S213, and then records the information into the RAM 70. On the basis of the tile dealing information recorded in the RAM 70, the CPU 66 displays various images including the tile images. As a result, an image indicating the game contents is displayed on the display device 32 of the gaming terminal 41A. On completion of this process, the procedure moves to step S121.

Figure 17:
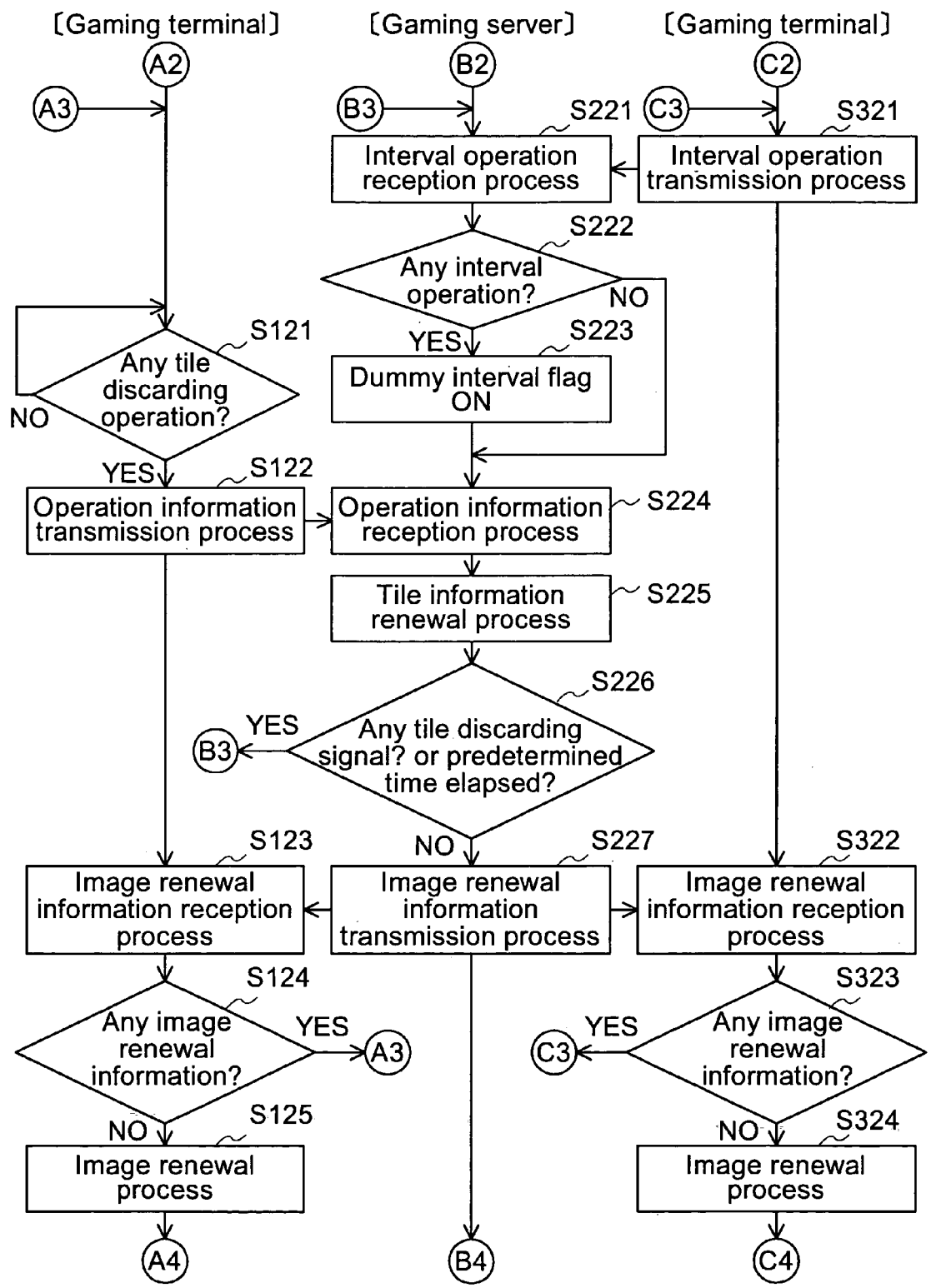
FIG. 17 shows a flowchart of a control process performed in a gaming system according to a preferred embodiment of the invention.

As shown in FIG. 17, in the gaming server 21, it is determined whether or not an interval operation has been performed (step S222). In this process, the CPU 22 determines whether or not information indicating that an interval operation has been performed by a player has been received from the gaming terminal 41A or the like.

For example, as shown in step S321, in the gaming terminal 41A or the like, when a player desiring the occurrence of a dummy interval touches the region of the "wait" button image so as to cause an interval operation, information indicating that the interval operation has been performed is transmitted from the gaming terminal 41A to the gaming server 21. On receiving the information (step S221), the CPU 22 of the gaming server 21 advances the procedure to step S223. When it is determined that no information is received, the CPU 22 advances the procedure to step S224.

In step S222, when it is determined that an interval operation has been performed, as described above, a dummy interval flag is set ON (step S223). In this process, the CPU 22 sets the dummy interval flag positioned in the RAM 23 to be ON. This dummy interval flag indicates that a dummy interval different from a special interval of a special mode is to be generated or not. As a result of this process, a dummy interval is generated in response to the operation of any one of the players.

On completion of this process, the procedure moves to step S224.

On the other hand, in the gaming terminal 41A, it is determined whether or not a tile discarding operation has been performed by the player (step S121). In this process, the CPU 66 receives the touch signal provided from the touch sensor 82, and then, on the basis of the touch signal, generates operation information indicating the tile discarding. Then, the CPU 66 transmits the operation information to the gaming server 21 via the communications interface circuit 74.

On the other hand, in the gaming server 21, an operation information reception process is performed (step S224). In this process, the CPU 22 receives the operation information via the communications interface circuit 26. On completion of this process, the procedure moves to step S225.

Then, in the gaming server 21, a tile information renewal process is performed (step S225). In this process, on the basis of the operation information having been received in step S224, the CPU 22 renews the tile information stored in the RAM 70. This permits the progress of the game based on the operation of the players. On completion of this process, the procedure moves to step S226.

Then, it is determined whether a tile discarding signal has been received or a predetermined time period has elapsed (step S226). In this process, the CPU 22 determines whether an operation information has been received in step S224 or a predetermined time period has elapsed since tile dealing.

In this process, when the CPU 22 determines that an operation information relevant to tile discarding has been received or that a predetermined time period has elapsed since tile dealing, the CPU 22 advances the procedure to step S227. When the CPU 22 determines that no operation information relevant to tile discarding has been received and that a predetermined time period has not yet elapsed since tile dealing, the CPU 22 advances the procedure to step S221.

As a result, when the "wait" button image for instructing the generation of a dummy interval is operated before tile discarding, this information is detected, so that a dummy interval is generated as described later. In summary, the process of steps S221-S223 and the process of step S321 realize the function of effect determining means for determining whether or not a dummy interval is to be generated. The function of effect determining means further includes the process of later-described step S246 for determining the interval time of the dummy interval.

As such, a dummy interval is generated separately from a special interval generated in a special mode. This permits the providing of the game without allowing the players to recognize whether or not the situation is in a special mode.

Then, in the gaming server 21, an image renewal information transmission process is performed (step S227). In this process, on the basis of the operation information relevant to tile discarding having been received in step S225, the CPU 22 transmits an image renewal signal indicating that a tile discarding has been performed, to the gaming terminal 41A and the like. When a predetermined time period has elapsed, it is assumed that a predetermined tile is discarded. On completion of this process, the procedure moves to step S231.

On the other hand, in the gaming terminal 41A and the like, an image renewal information reception process is performed (step S123). In this process, the CPU 66 receives the image renewal information via the communications interface circuit 74. On completion of this process, the procedure moves to step S124.

Then, it is determined whether or not image renewal information has been received (step S124). In this process, when the CPU 66 determines that the image renewal information of step S123 has been received, the CPU 66 advances the procedure to step S125. When the CPU 66 determines that no image renewal information has been received, the CPU 66 advances the procedure to step S121. This permits the operation for generating a dummy interval in the next process until image renewal information indicating that a tile discarding has been performed is received.

Figure 20:
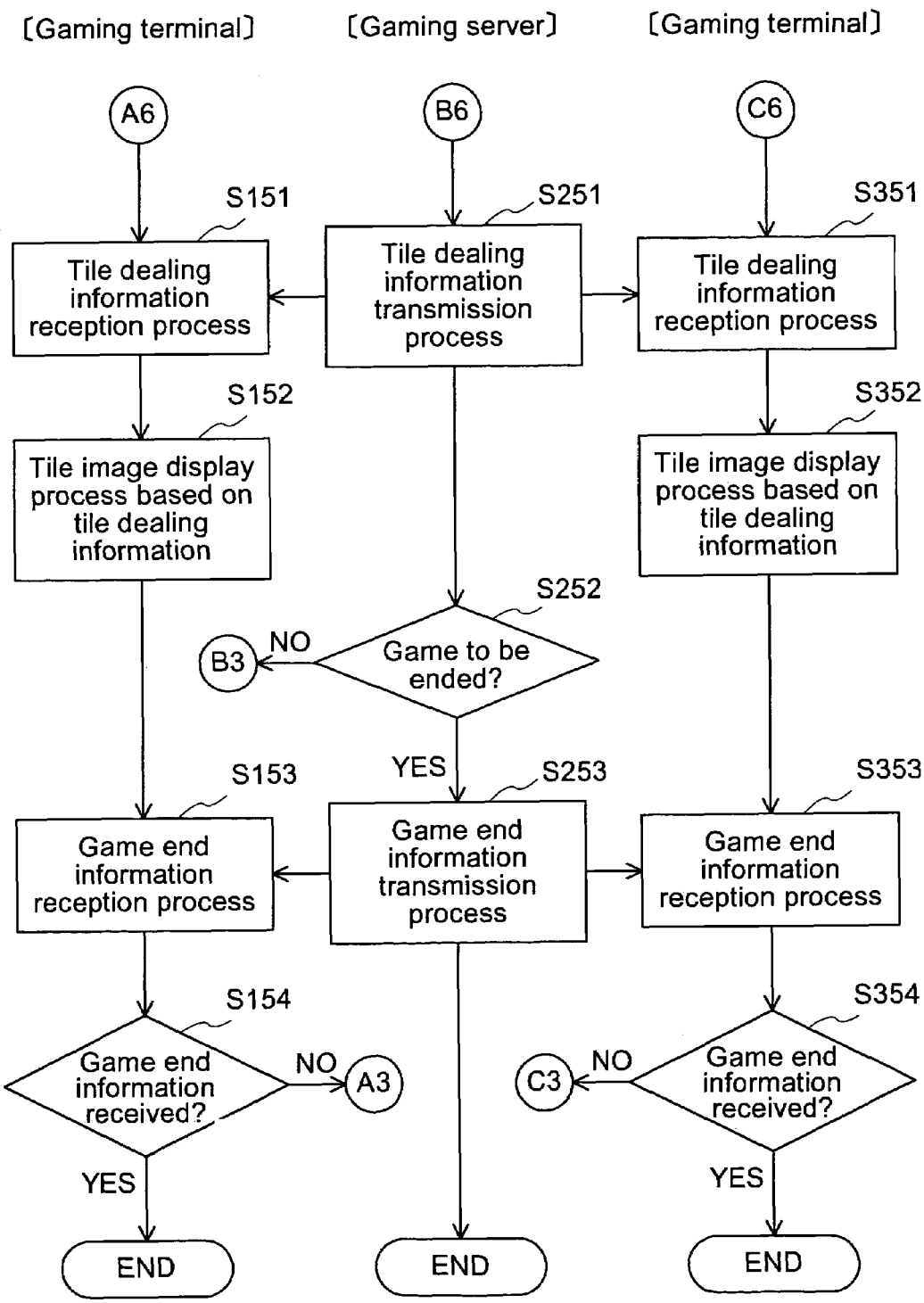
FIG. 20 shows a flowchart of a control process performed in a gaming system according to a preferred embodiment of the invention.

Then, in the gaming terminal 41A and the like, an image renewal process is performed (step S125). In this process, on the basis of the image renewal information having been received in step S123, the CPU 66 displays an image on the display device 32. For example, when a tile is discarded, the discarded tile is displayed, while the image of individual tiles of the players having discarded the tile is renewed on the display device 32. On completion of this process, the procedure moves to step S151 (FIG. 20).

Figure 18:
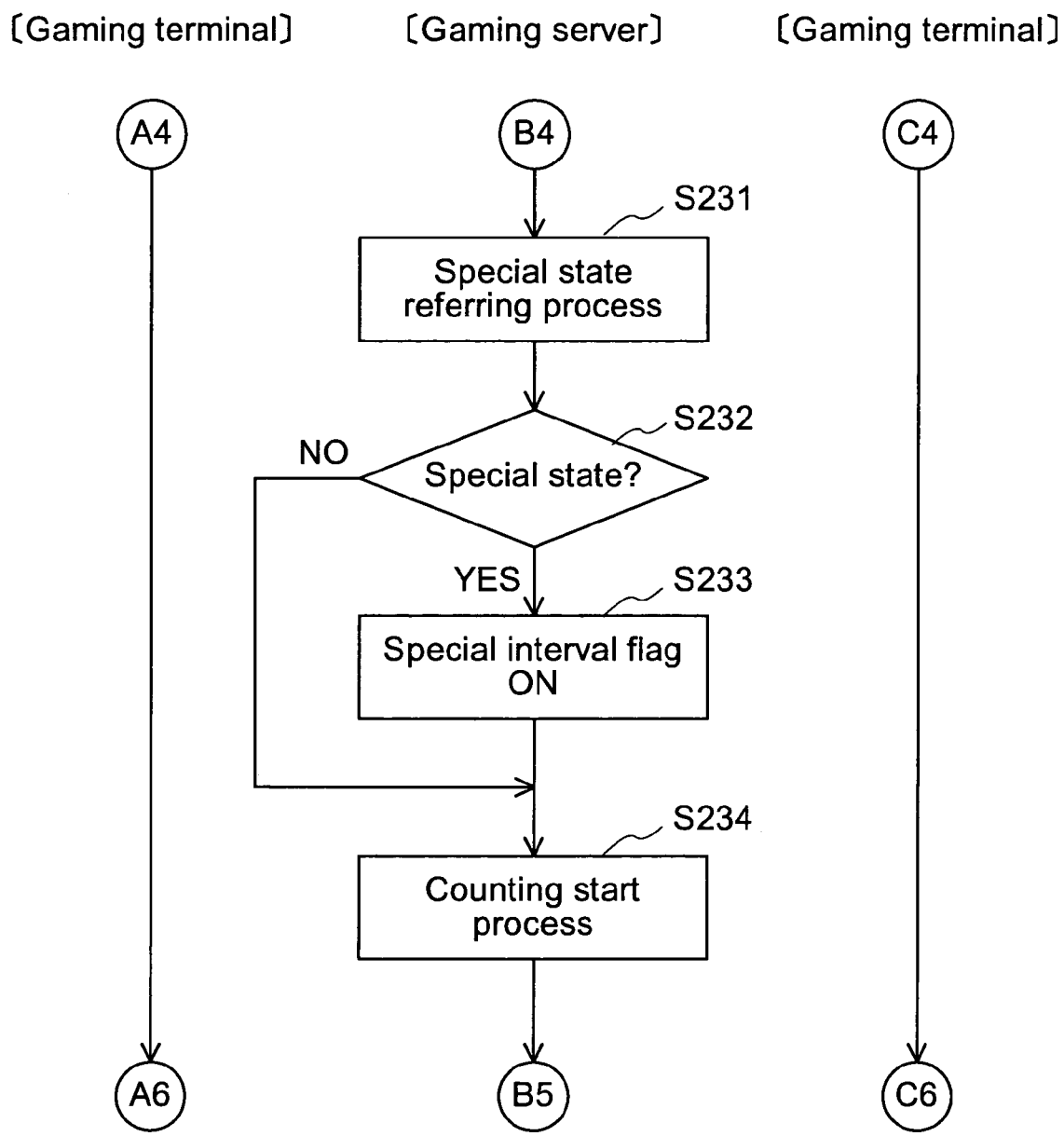
FIG. 18 shows a flowchart of a control process performed in a gaming system according to a preferred embodiment of the invention.

On the other hand, in the gaming server 21, a special mode referring process is performed (FIG. 18, step S231). In this process, the CPU 22 reads the information of individual tiles of the players and the newest discarded tile from the RAM 23, and then determines whether or not the individual tiles and the discarded tile are in a predetermined combination, that is, whether or not the situation is in a special mode (step S232). Here, a special mode indicates a mode where the operation of 'pon,' 'chii,' or 'kan' can be performed so as to accomplish a predetermined combination from a part of the individual tiles and the discarded tile. In this process, when the CPU 22 determines that the situation is in a special mode, the CPU 22 advances the procedure to step S233. When the CPU 22 determines that the situation is not in a special mode, the CPU 22 advances the procedure to step S234.

Then, in the gaming server 21, the process of setting the special interval flag is performed (step S233). In this process, when the CPU 22 determines that the situation is in a special mode on the basis of step S232, the CPU 22 renews the RAM 70 so as to set the special interval flag to be ON. On completion of this process, the procedure moves to step S234.

Then, in the gaming server 21, a count start process is performed (step S234). In this process, the CPU 22 sets the timer built in the CPU 22 to be at a predetermined value, and then starts counting. On completion of this process, the procedure moves to step S241.

Figure 19:
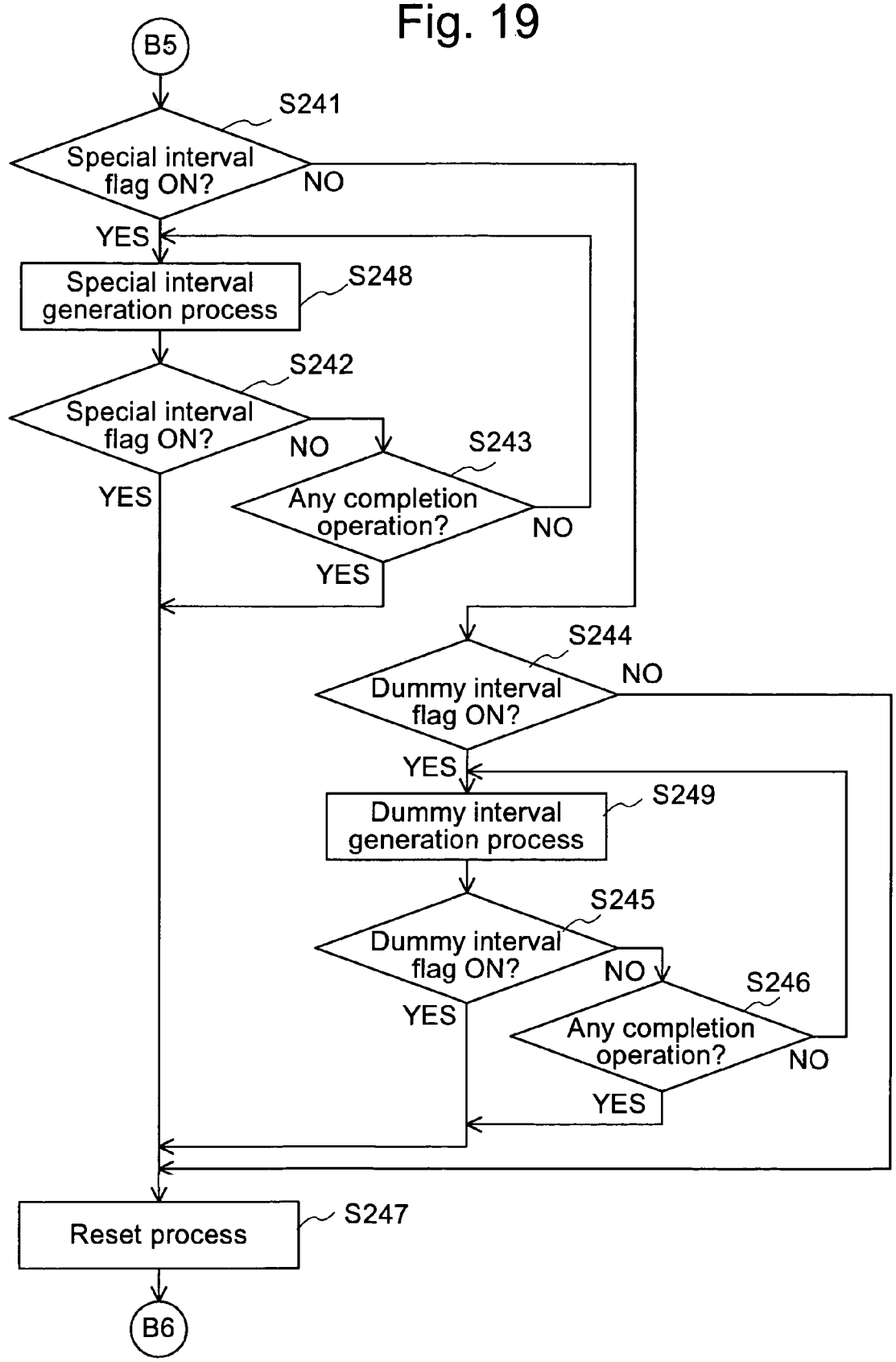
FIG. 19 shows a flowchart of a control process performed in a gaming system according to a preferred embodiment of the invention.

Then, as shown in FIG. 19, in the gaming server 21, it is determined whether or not the special interval flag is ON (step S241). In this process, the CPU 22 determines whether or not the special interval flag positioned in the RAM 23 is ON. When the CPU 22 determines that the special interval flag positioned in the RAM 23 is ON, the CPU 22 advances the procedure to step S248. When the CPU 22 determines that the special interval flag is not ON, the CPU 22 advances the procedure to step S244.

Then, a special interval generation process is performed (step S248). In this process, the CPU 22 generates a special interval, and then transmits special interval generation information indicating the generation of a special interval, to the gaming terminal 41A or the like via the communications interface circuit 26. The gaming terminal 41A having received the information generates a special interval. At that time, the gaming terminal in the special interval notifies the player about the special interval by displaying a visible signature such as blinking in the image, while the other gaming terminals do not notify of the special interval. On completion of this process, the procedure moves to step S242.

Then, it is determined whether or not the remaining time of the special interval is zero (step S242). In this process, the CPU 22 monitors the value of the timer count having been started in step S234, so as to determine whether or not the value is zero. When the CPU 22 determines that the timer count is zero, the CPU 22 advances the procedure to step S247. When the CPU 22 determines that the timer count is not zero, the CPU 22 advances the procedure to step S243.

In step S243, the CPU 22 determines whether or not any completion operation has been performed. In this process, via the communications interface circuit 26, when the CPU 22 determines that any operation has been performed, the CPU 22 advances the procedure to step S248 again. When the CPU 22 determines that no operation has been performed, the CPU 22 advances the procedure to step S247. An example of the operation described here is operation information provided from the gaming terminal 41A and the like for clearing and finishing the special mode. According to this configuration, the special interval is continued until such an operation is performed. When such an operation is performed or alternatively when a predetermined time period has elapsed, the special interval is cleared.

Then, in the gaming server 21, it is determined whether or not the dummy interval flag is ON (step S244). In this process, the CPU 22 determines whether or not the dummy interval flag positioned in the RAM 23 is ON. When the CPU 22 determines that the dummy interval flag positioned in the RAM 23 is ON, the CPU 22 advances the procedure to step S249. When the CPU 22 determines that the dummy interval flag is not ON, the CPU 22 advances the procedure to step S247.

Then, a dummy interval generation process is performed (step S249). In this process, the CPU 22 generates a dummy interval, and then transmits dummy interval generation information indicating the generation of a dummy interval, to the gaming terminal 41A or the like via the communications interface circuit 26. The gaming terminal 41A having received the information generates a dummy interval. At that time, the gaming terminal generating the dummy interval notifies the player about the dummy interval, while the other gaming terminals do not notify their respective players that the dummy interval is performed. This configuration prevents the players operating the other gaming terminals from finding the type of interval and from understanding whether or not the situation is in a special mode. On completion of this process, the procedure moves to step S245.

Then, it is determined whether or not the remaining time of the dummy interval is zero (step S245). In this process, the CPU 22 monitors the value of the timer count having been started in step S234, so as to determine whether or not the value is zero. When the CPU 22 determines that the timer count is zero, the CPU 22 determines that the predetermined time period has elapsed in the dummy interval, so as to advance the procedure to step S247. When the CPU 22 determines that the timer count is not zero, the CPU 22 advances the procedure to step S246.

Then, it is determined whether or not any completion operation has been performed (step S246). In this process, via the communications interface circuit 26, when the CPU 22 determines that any operation has been performed, the CPU 22 advances the procedure to step S249 again. When the CPU 22 determines that no operation has been performed, the CPU 22 advances the procedure to step S247. An example of the operation described here is operation information provided from the gaming terminal 41A and the like for clearing and finishing the effect mode. According to this configuration, the dummy interval is continued until such an operation is performed. When such an operation is performed or alternatively when a predetermined time period has elapsed, the dummy interval is cleared. That is, the operation of the player determines the interval length of the dummy interval within the predetermined time range.

The process of steps S241, S242, S248, S243, S244, S249, and S245 realizes the function of the effect means for generating a dummy interval in the normal mode.

Then, in the gaming server 21, a reset process is performed (step S247). In this process, the CPU 22 resets various flags positioned in the RAM 23. For example, the special interval flag, the dummy interval flag, and the like are reset, so that various setting parameters are initialized. On completion of this process, the procedure moves to step S251.

Then, as shown in FIG. 20, a tile dealing information transmission process is performed (step S251). In this process, the CPU 22 transmits the tile dealing information having been generated in step S212, to the gaming terminal 41A and the like of the players having been determined as the player group. On completion of this process, the procedure moves to step S252.

On the other hand, in the gaming terminal 41A and the like, a tile dealing information reception process is performed (step S151). In this process, the CPU 66 receives the tile dealing information having been transmitted in step S251, and then records the information into the RAM 70. On the basis of the tile dealing information recorded in the RAM 70, the CPU 66 displays various images including the tile images. As a result, an image indicating the game contents is displayed on the display device 32 of the gaming terminal 41A (step S152). On completion of this process, the procedure moves to step S153.

Then, in the gaming server 21, it is determined whether or not the game is to be ended (step S252). In this process, when a predetermined condition is satisfied, the CPU 22 reads game end information positioned in the RAM 70, and then on the basis of the information, determines whether or not the game is to be ended. When the CPU 22 determines that the game is to be ended, the CPU 22 advances the procedure to step S253. When the CPU 22 determines that the game is not to be ended, the CPU 22 advances the procedure to step S221.

As such, the game can be played repeatedly until the game end is determined. In each time of drawing one tile, a special interval and a dummy interval can be generated. The above-mentioned predetermined condition can take various forms in a mah-jong game. Examples of such a condition include the dealt tiles being in a predetermined combination, that a predetermined number of tiles have been dealt, and that operation information provided from the gaming terminal 41A and the like has been received.

In step S253, the CPU 22 performs a game end information transmission process. In this process, the CPU 22 transmits the game end information for terminating the game, to the gaming terminal 41A and the like via the communications interface circuit 26, and then determines whether or not the gaming terminal 41A and the like have received the game end information (steps S153 and S154). When the CPU 22 determines that the gaming terminal 41A and the like have received the game end information, the present subroutine is terminated. When the CPU 22 determines that the gaming terminal 41A and the like have not received the game end information, the CPU 22 advances the procedure to step S121.

As such, regardless of whether or not the situation is in a special mode, an "dummy interval" imitating the above-mentioned "special interval" can be generated by the operation of the player. This permits the providing of the game without allowing the other players to recognize whether or not the present player is in an actual special mode.

Further, a dummy interval different from a special interval is generated in response to the operation of the player. Thus, in addition to the above-mentioned advantage, this configuration allows the plurality of players to bargain with each other. This permits a realistic game.

Further, the interval time of the dummy interval is determined depending on the operation of the players. Thus, in addition to the above-mentioned advantage, this configuration allows the plurality of players to bargain with each other. This permits a realistic game.

In this embodiment, the number of times of allowed dummy interval generation is not limited. However, the invention is not limited to this configuration. That is, the number of times of allowed dummy interval generation may be limited.

For example, when the function of limiting the number of times of allowed dummy interval generation is added to the above-mentioned gaming system, the upper limit of the allowed number for each player is stored in the RAM 23 or the storage unit 28 in each game turn. Then, the CPU 22 counts the number of times of actual dummy interval generation for each player. When the counted number has reached the upper limit, the CPU 22 performs the control of invalidating the operation of the dummy interval of the player. This avoids unlimited delay in the game, and still permits a game with tactics among the players under an even condition.

Further, the number of game times may be determined on the basis of various game results and game contents or on the basis of the result of a lottery. This permits the providing of a chance-dependent game, and allows the players to enjoy the game regardless of their game skills.

In this embodiment, means for determining the result of the game is provided in the gaming server 21. However, the invention is not limited to this configuration. That is, the means for determining the result of the game may be provided in a device other than the gaming server 21.

Further, in this embodiment, a dummy interval is generated depending on the operation of the player, and the length of the dummy interval is determined depending on the operation of the player. However, the invention is not limited to this configuration. For example, the time of the dummy interval may be determined such that the dummy interval is generated in a timing different from the operation of the player. For example, the dummy interval may be generated on the basis of a random number generated by the CPU 22 of the gaming server 21 and of a dummy interval generation table which is used for generating a dummy interval and which is stored in a recording medium such as the ROM 24 and the storage unit 28.

In these embodiments, preferable examples in a mah-jong game have been described. However, the invention is not limited to these embodiments, and is applicable to various game machines and game modes in which a special interval is generated that prompts the players to an operation. In particular, the invention is preferably applicable to a game, such as card games including poker, in which tactics are performed among the players.

The description of advantages in this specification is only an illustration of most preferable advantages obtained in the invention. The advantages obtained in the invention are not limited to those described in this specification.

According to the invention, a dummy interval is generated separately from a special interval generated in a special mode. This permits the providing of a game without allowing the players to recognize whether or not the situation is in a special mode.

What is claimed is:

1. A gaming system for providing a game to a player group consisting of a plurality of players, wherein the game is played among the plurality of players, the gaming system comprising: a plurality of terminals operable by the respective plurality of the players; and a gaming server communicating with the plurality of the terminals,
   wherein the gaming server comprises a controller executing a computer program and controlling the plurality of the terminals, and
   wherein a progress of the game comprises a normal mode whereby the players in the player group operate the game in turn, and a special mode which occurs in accordance with a game status of the player group,
   wherein the controller generates a special interval for stopping the progress of the game in the special mode, and
   wherein the controller generates a dummy interval imitating the special interval in the normal mode during the game.

2. The gaming system according to claim 1, wherein the controller determines whether to generate the dummy interval.

3. The gaming system according to claim 1, wherein the controller determines whether to generate the dummy interval based on an operation by at least one of the plurality of the players.

4. The gaming system according to claim 1, wherein the controller determines a length of the dummy interval.

5. The gaming system according to claim 4, wherein the controller determines the length of the dummy interval based on an operation by at least one of the plurality of the players.

6. The gaming system according to claim 1, wherein the game is a mah-jong game.

* * * * *